United States Patent
Luo et al.

(10) Patent No.: US 12,272,971 B2
(45) Date of Patent: Apr. 8, 2025

(54) EXCITATION-QUADRATURE-QUADRATURE TRANSMITTER WIRELESS POWER TRANSFER SYSTEM

(71) Applicants: THE GOVERNING COUNCIL OF THE UNIVERSITY OF TORONTO, Toronto (CA); ELEAPPOWER LTD., Toronto (CA)

(72) Inventors: Zhichao Luo, Toronto (CA); Shuang Nie, Toronto (CA); Mehanathan Pathmanathan, Toronto (CA); Peter Waldemar Lehn, Toronto (CA)

(73) Assignees: INNOVATIONS & PARTNERSHIPS OFFICE UNIVERSITY OF TORONTO, Toronto (CA); ELEAPPOWER LTD., Toronto (CA)

( * ) Notice: Subject to any disclaimer, the term of this patent is extended or adjusted under 35 U.S.C. 154(b) by 0 days.

(21) Appl. No.: 18/275,746

(22) PCT Filed: Feb. 9, 2022

(86) PCT No.: PCT/CA2022/050182
§ 371 (c)(1),
(2) Date: Aug. 3, 2023

(87) PCT Pub. No.: WO2022/170424
PCT Pub. Date: Aug. 18, 2022

(65) Prior Publication Data
US 2024/0039345 A1 Feb. 1, 2024

Related U.S. Application Data

(60) Provisional application No. 63/147,637, filed on Feb. 9, 2021.

(51) Int. Cl.
*H02J 50/90* (2016.01)
*B60L 53/122* (2019.01)
(Continued)

(52) U.S. Cl.
CPC ............ *H02J 50/90* (2016.02); *B60L 53/122* (2019.02); *B60L 53/39* (2019.02); *H02J 50/12* (2016.02); *H02J 50/402* (2020.01)

(58) Field of Classification Search
CPC .......... H02J 50/12; H02J 50/40; H02J 50/402; H02J 50/80; H02J 50/90; H02J 50/50;
(Continued)

(56) References Cited

U.S. PATENT DOCUMENTS 11,133,714 B1 * 9/2021 Boulanger ............ H02J 50/005
2010/0259217 A1 * 10/2010 Baarman ................ H02J 50/80
320/108

(Continued)

OTHER PUBLICATIONS

Mehanathan Pathmanathan et al., Field-Oriented Control of a Three-Phase Wireless Power Transfer System Transmitter (Year: 2019).*
(Continued)

*Primary Examiner* — Hal Kaplan
*Assistant Examiner* — Rasem Mourad
(74) *Attorney, Agent, or Firm* — Norton Rose Fulbright Canada LLP

(57) ABSTRACT

There is described a wireless power transfer system utilizing a new excitation-quadrature-quadrature transmitter pad which includes one excitation coil and at least two decoupled quadrature auxiliary coils. A described resonant tank design method is proposed for constant-current charging and zero phase angle conditions. When there is a lateral misalignment in the receiver pad, the auxiliary coil that is better coupled with the receiver pad conducts more current than the more distant auxiliary coil does, reducing the leakage magnetic field in the surrounding area and/or improving transmission efficiency.

20 Claims, 18 Drawing Sheets

(51) Int. Cl.
  *B60L 53/39* (2019.01)
  *H02J 50/12* (2016.01)
  *H02J 50/40* (2016.01)
(58) Field of Classification Search
  CPC ........ H02J 50/70; B60L 53/122; B60L 53/39; B60L 53/12
  See application file for complete search history.

(56) References Cited

U.S. PATENT DOCUMENTS

| | | | | |
|---|---|---|---|---|
| 2013/0038135 | A1* | 2/2013 | Ichikawa | H01F 27/363 307/104 |
| 2014/0191586 | A1* | 7/2014 | Ichikawa | B60L 53/39 307/104 |
| 2017/0054329 | A1* | 2/2017 | You | H02J 50/50 |
| 2017/0222490 | A1 | 8/2017 | Boys et al. | |
| 2018/0090954 | A1 | 3/2018 | Graham et al. | |
| 2018/0166928 | A1* | 6/2018 | Wu | H01F 38/14 |
| 2018/0174745 | A1 | 6/2018 | Percebon et al. | |
| 2019/0372387 | A1* | 12/2019 | Wan | H02J 7/00 |
| 2020/0290467 | A1 | 9/2020 | Gao et al. | |
| 2022/0385115 | A1* | 12/2022 | Zhang | H02J 50/10 |

OTHER PUBLICATIONS

Canadian Intellectual Property Office (CIPO), International Search Report and Written Opinion to PCT/CA2022/050182, May 17, 2022.

Jawad et al., "Wireless Drone Charging Station Using Class-E Power Amplifier in 1-31 Vertical Alignment and Lateral Misalignment Conditions". Energies, Feb. 11, 2022 (Feb. 11, 2022), vol. 2022; 15(4): 1298, pp. 1-29, DOI: 10.3390/enl5041298.

Namadmalan et al., "Self-Aligning Capability of IPT Pads for High-Power Wireless 1-31 EV Charging Stations". IEEE Transactions on Industry Applications (Early Access), Mar. 11, 2022 (Mar. 11, 2022), pp. 1-9, DOI: 10.1109/TIA.2022.3158636.

Niculae et al., "The influence of the alignment between receiver and transmitter coils 1-31 on efficiency of wireless transfer energy". 2016 International Conference on Applied and Theoretical Electricity (ICATE), Nov. 24, 2016 (Nov. 24, 2016), Conference in Craiova, Romania: Oct. 6-8, 2016, pp. 1-5, DOI: 10.1109/ICATE.2016. 7754704.

Mickel Budhia et al., Development of a Single-Sided Flux Magnetic Coupler for Electric Vehicle IPT Charging Systems, IEEE Transactions on Industrial Electronics, vol. 60, No. 1, Jan. 2013.

Mickel Budhia et al., A New IPT Magnetic Coupler for Electric Vehicle Charging Systems, Downloaded on Jan. 29, 2024 at 19:43:30 UTC from IEEE Xplore.

Mickel Budhia et al., Design and Optimization of Circular Magnetic Structures for Lumped Inductive Power Transfer Systems, IEEE Transactions on Power Electronics, vol. 26, No. 11, Nov. 2011.

Itaru Fujita et al., A 10kW Transformer with a Novel Cooling Structure of a Contactless Power Transfer System for Electric Vehicles, Downloaded on Jan. 29, 2024 at 19:44:45 UTC from IEEE Xplore.

Zhichao Luo et al., Analysis of Square and Circular Planar Spiral Coils in Wireless Power Transfer System for Electric Vehicles, IEEE Transactions on Industrial Electronics, vol. 65, No. 1, Jan. 2018.

Chun Qiu et al., Modular inductive power transmission system for high misalignment electric vehicle application, Research Article, Magnetism and Magnetic Materials, Apr. 16, 2015.

Junjun Deng et al., Compact and Efficient Bipolar Coupler for Wireless Power Chargers: Design and Analysis, IEEE Transactions on Power Electronics, vol. 30, No. 11, Nov. 2015.

Seho Kim et al., Tripolar Pad for Inductive Power Transfer Systems for EV Charging, IEEE Transactions on Power Electronics, vol. 32, No. 7, Jul. 2017.

Mehanathan Pathmanathan et al., Field-Oriented Control of a Three-Phase Wireless Power Transfer System Transmitter, IEEE Transactions on Transportation Electrification, vol. 5, No. 4, Dec. 2019.

Adeel Zaheer et al., A Bipolar Pad in a 10-kHz 300-W Distributed IPT System for AGV Applications, IEEE Transactions on Industrial Electronics, vol. 61, No. 7, Jul. 2014.

Jian Zhang et al., Comparative Analysis of Two-Coil and Three-Coil Structures for Wireless Power Transfer, IEEE Transactions on Power Electronics, vol. 32, No. 1, Jan. 2017.

SangCheol Moon et al., Analysis and Design of a Wireless Power Transfer System With an Intermediate Coil for High Efficiency, IEEE Transactions on Industrial Electronics, vol. 61, No. 11, Nov. 2014.

SangCheol Moon et al., Wireless Power Transfer System With an Asymmetric Four-Coil Resonator for Electric Vehicle Battery Chargers, IEEE Transactions on Power Electronics, vol. 31, No. 10, Oct. 2016.

Yong Li et al., Analysis and Design of Load-Independent Output Current or Output Voltage of a Three-Coil Wireless Power Transfer System, IEEE Transactions on Transportation Electrification, vol. 4, No. 2, Jun. 2018.

Lin Yang et al., Analysis and Design of Three-Coil Structure WPT System With Constant Output Current and Voltage for Battery Charging Applications, 10.1109/ACCESS.2019.2925388, Jul. 17, 2019.

Xiaohui Qu et al., Hybrid IPT Topologies With Constant Current or Constant Voltage Output for Battery Charging Applications, IEEE Transactions on Power Electronics, vol. 30, No. 11, Nov. 2015.

* cited by examiner

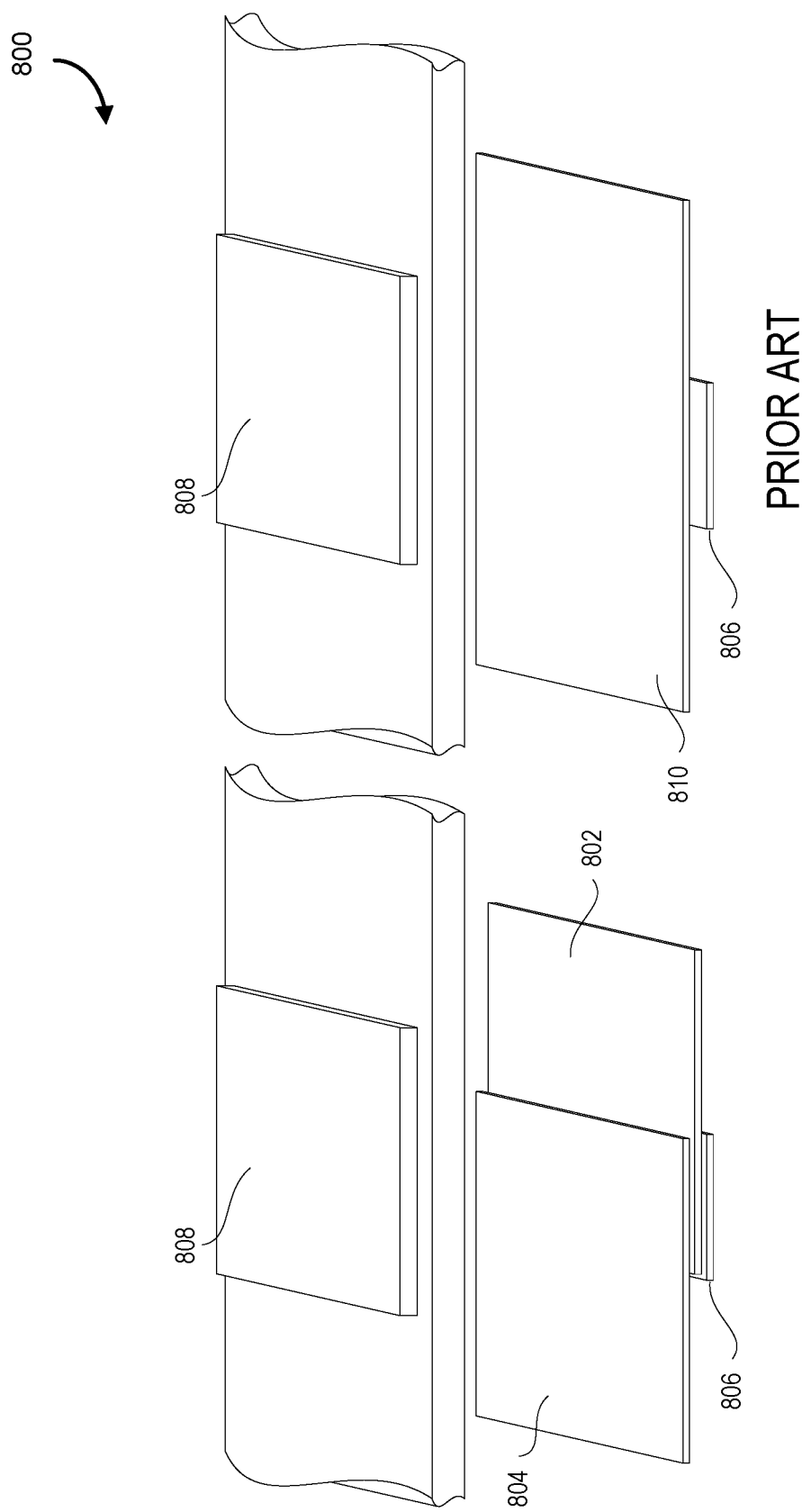

EXCITATION-QUADRATURE-QUADRATURE TRANSMITTER WIRELESS POWER TRANSFER SYSTEM

CROSS-REFERENCE

This application is a non-provisional of, and claims all benefit to, including priority from, U.S. Provisional Application No. 63/147,637, filed Feb. 9, 2021, entitled "Excitation-Quadrature-Quadrature Transmitter Wireless Power Transfer System", incorporated herein by reference in its entirety.

FIELD

Embodiments of the present disclosure generally relate to the field of electrical circuits for wireless power transmission, and more specifically, embodiments relate to devices, systems and methods for improved wireless charging when the receiver pad is misaligned relative to a transmitter pad.

INTRODUCTION

Wireless power transfer (WPT) is now gaining popularity for electric vehicle (EV) charging as EVs are proliferating due to their environmental-friendly attributes.

However, efficient operation in the case of lateral misalignment and leakage magnetic field shielding are two major concerns in wireless charging for EVs.

Misalignment occurs where the receiver pad and the transmitter pad are not properly aligned, which is a common occurrence for wireless power transfer systems. For example, a receiver pad may be coupled to the bottom of a vehicle, and a parking spot may have a transmitter pad, so that when the vehicle is parked in the parking spot, the transmitter pad transmits energy to charge the vehicle. Depending on how the vehicle is parked, the receiver pad and transmitter pad may not be entirely in alignment. For example, there can be front-to-end lateral misalignment and door-to-door lateral misalignment.

Misalignments represent a major technical challenge that arises as it is difficult to park a vehicle consistently over a same target spot with the correct orientation.

SUMMARY

As the amount of energy being delivered from the transmitter pad to the receiver pad can be very significant (e.g., enough to charge an electric vehicle (EV), especially at a higher rate of charge), transfer efficiency is an important consideration.

Misalignments between a receiver pad and a transmitter can occur (e.g., EV not parked directly over the pad), and in these situations, the misalignment could lead to a significantly decreased power transfer efficiency, along with potential safety issues where leakage electrical fields may be directed to positions where a human may be present (e.g., a person with a pacemaker standing over a portion of the pad). Misalignments can occur front-to-end, or laterally (e.g., door-to-door). In the context of a wireless charger for an electric vehicle, such as an automobile, lateral misalignment is more difficult for a driver to adjust, as a vehicle can easily move forwards and backwards, but cannot easily move side to side.

The present application is directed to an improved transmitter pad architecture, corresponding methods, computer program products. In particular, the improved transmitter pad includes a first auxiliary charging coil and a second auxiliary charging coil that interoperate together along with an excitation coil to deliver power to a corresponding receiver pad. Power delivery from the first auxiliary charging coil and the second auxiliary charging coil is controlled such that electrical power delivery is balanced as between the first auxiliary charging coil and the second auxiliary charging coil to automatically steer (e.g., re-orienting, re-directing, projected, shifting, etc. the overall magnetic field from both auxiliary coils to the receiver pad) a magnetic flux towards a misaligned (e.g., laterally misaligned) transmitter pad. Accordingly, the proposed approach does not require external guidance mechanisms (e.g., cameras to track and measure the misalignment).

In particular, the first auxiliary charging coil and the second auxiliary charging coil are positioned such that the first auxiliary charging coil and the second auxiliary charging coil overlap (e.g., overlay) to decouple or significantly reduce coupling as between each of the first auxiliary charging coil and the second auxiliary charging coil with one another. In the lateral direction, for example, the auxiliary coils may have offset geometric centers (e.g., not perfectly on top of one another).

Each of the first auxiliary charging coil and the second auxiliary charging coil are coupled to a central excitation coil, and the excitation coil is not designed to be coupled to the receiver coil (e.g., there may still be negligible coupling). The coupling between the auxiliary coil and the receiver is significantly greater than the coupling between the excitation coil and the receiver such that the vast majority (e.g., 90, 95, 96, 97, 98, 99, 99.5%) of power is transferred from the auxiliary coils to the receiver and not from the excitation coil to the receiver.

The compensation capacitors of the entire system are adapted (e.g., for a range of misalignments, the system is designed to have this property) to maintain a zero phase shift between the excitation voltage and the current such that the currents naturally adjust based on the lateral misalignment without requiring an intervention mechanism to help guide the power delivery. The system is able to operate without active control of the compensation capacitors, requiring less power electronic converters on the transmitter (relative to active control), and there is no need to have a sensor or sensorless position detection algorithm of the receiver pad.

In a practical embodiment, the transmitter pad can be manufactured having a specific geometry established between the auxiliary coils and the excitation coils and one another, as well as specifically selected compensation capacitors. It is important to note that the system can be extremely sensitive to small variations in geometry. During manufacturing, magnetic shielding layers may also be included, and the impact on the mutual coupling of those magnetic shielding layers may be taken into account in the design of the compensation capacitors. Magnetic shielding layers are useful in improving the overall safety profile of the device. The proposed transmitter pad may be implemented as an enclosed package (e.g., in a housing), and can be provided in a kit along with a corresponding receiver pad. In another embodiment, a number of different receiver pads may be provided that are adapted for different power transfer characteristics.

The technology described in various embodiments herein are adapted, among others, to improve the speed of adoption of electric vehicle technology by providing improved electrical infrastructure (e.g., improved charging), although not all embodiments are necessarily used for electric vehicles per se. For example, the charging pad may be used in relation to industrial robotics, household devices (e.g., automated vacuum cleaners), or mounted on an arm and brought to meet the receiver pad. The adoption of wireless charging with improved efficiency and safety profiles, and furthermore, the adoption of electrical vehicles can be useful to resolve or mitigate environmental impacts or to conserve the natural environment or natural resources as it may aid in reducing a reliance on fuel sources for combustion (e.g., gasoline).

A receiver pad configured for interoperation with the proposed transmitter pad is also contemplated, along with electric vehicles or devices having a receiver pad electrically coupled to on-board storage devices. In some embodiments, the receiver and transmitter pad transfer energy, including only signal or power components, or both signal and power components. Signal, for example, can be captured through various types of modulation applied to the energy transfer.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures.

The legends are presented in microTesla, and the numbers given by standards for exposure are approximately 27 microTesla.

Figure 6A:
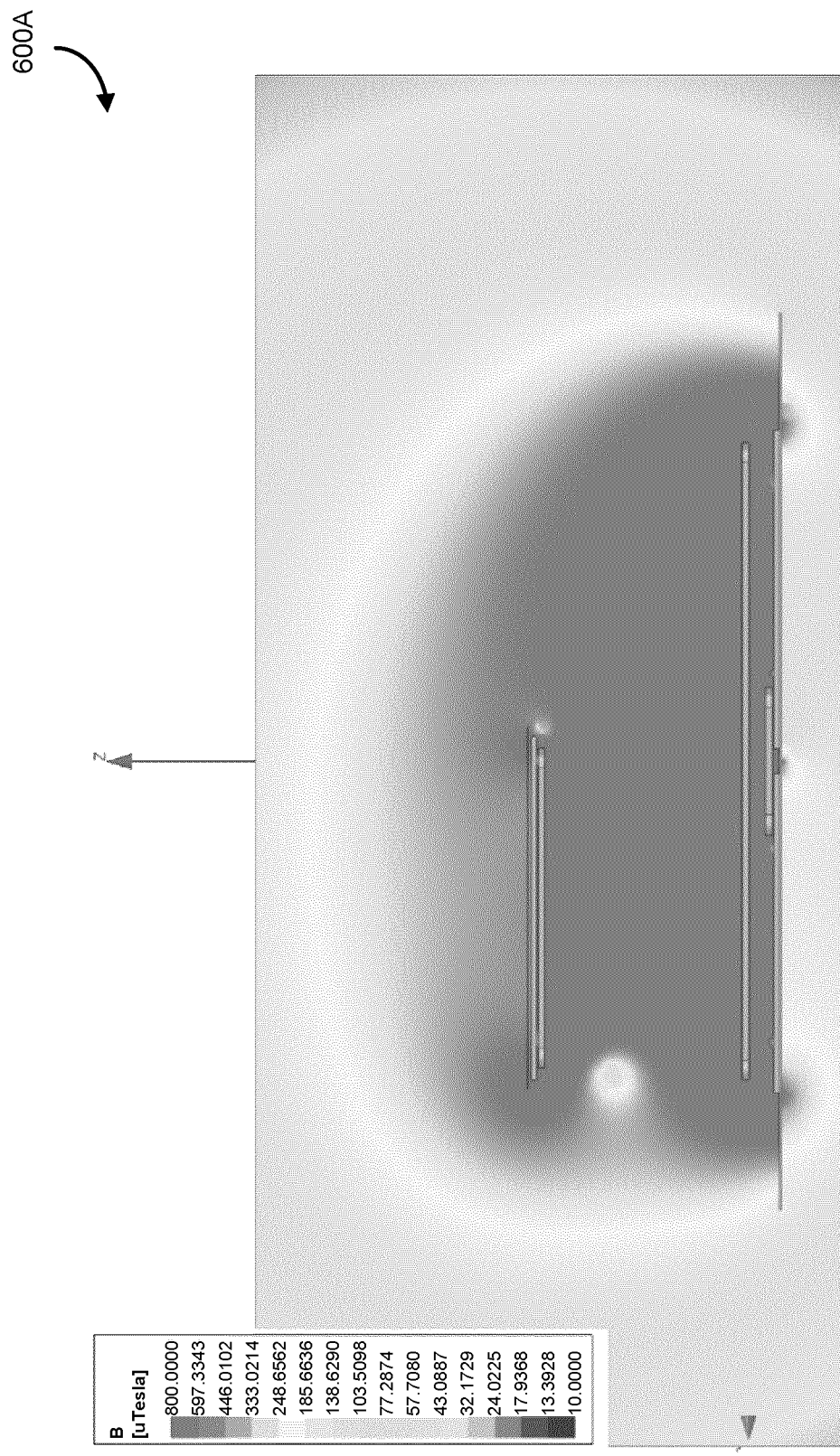
FIG. 6A and FIG. 6B include two graphs (field plots of magnetic flux density magnitude) showing the magnetic field distribution in FIG. 6A, (a) a three-coil system compared in FIG. 5 at 150 mm lateral misalignment and in FIG. 6B, (b) the embodiment of the of the disclosed EQQ transmitter WPT system compared in FIG. 5 at 150 mm lateral misalignment.

FIG. 6A is a graph directed to a different system that is presented for comparison, and the transmitter consists of a excitation coil of the same dimensions as the proposed system, and instead of two overlapped auxiliary coils, one very large auxiliary coil is used. FIG. 6A shows the magnetic flux density magnitude observed for a specific power transfer. It is important to note that in FIG. 6A, there is significant leakage relative to FIG. 6B.

Figure 6B:
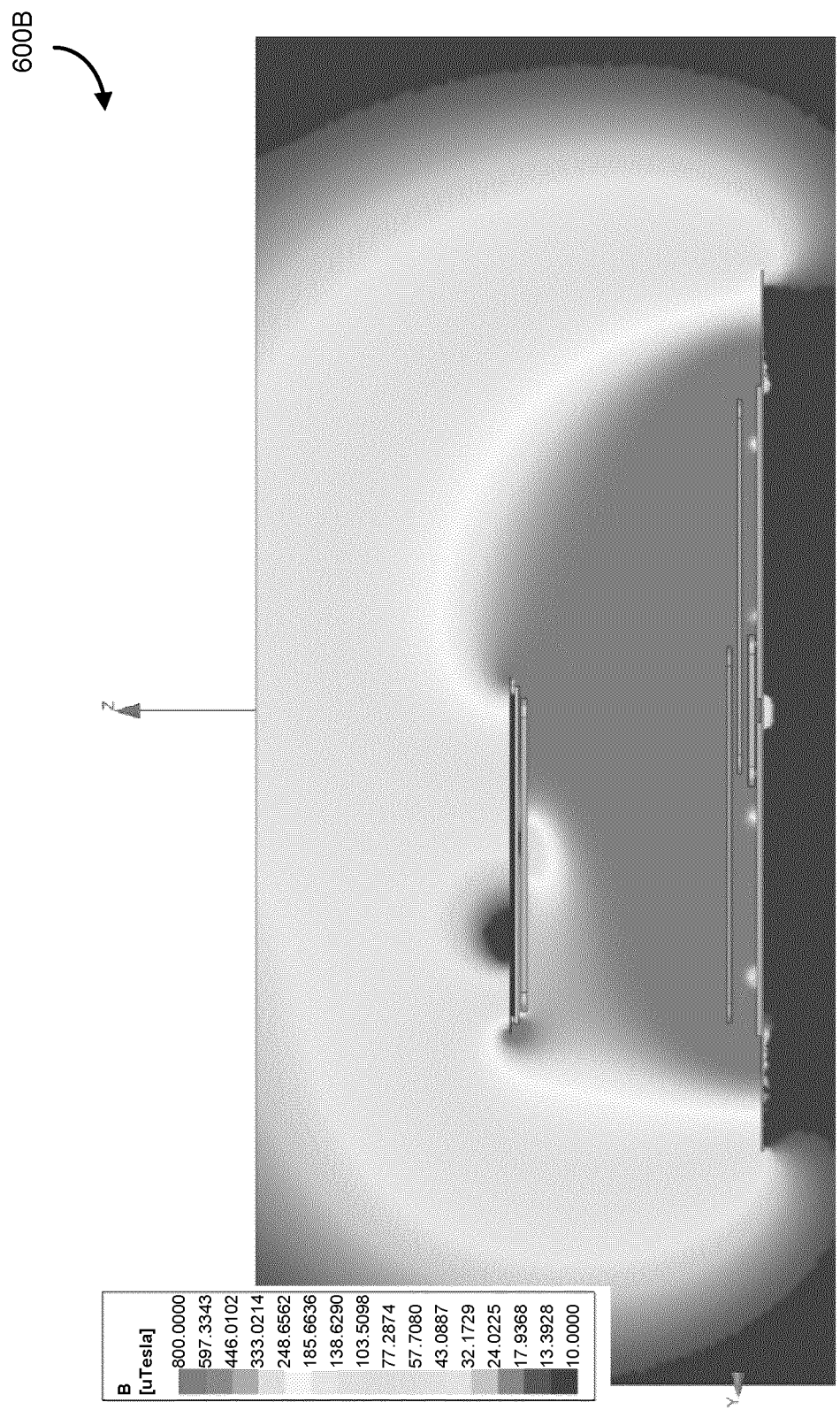

FIG. 6B is a graph directed to a magnetic flux density for an embodiment the proposed system for the same transfer, and relative to FIG. 6A, the magnetic field for the proposed system is largely contained within a small distance from the wireless power transfer apparatus.

Figure 4:
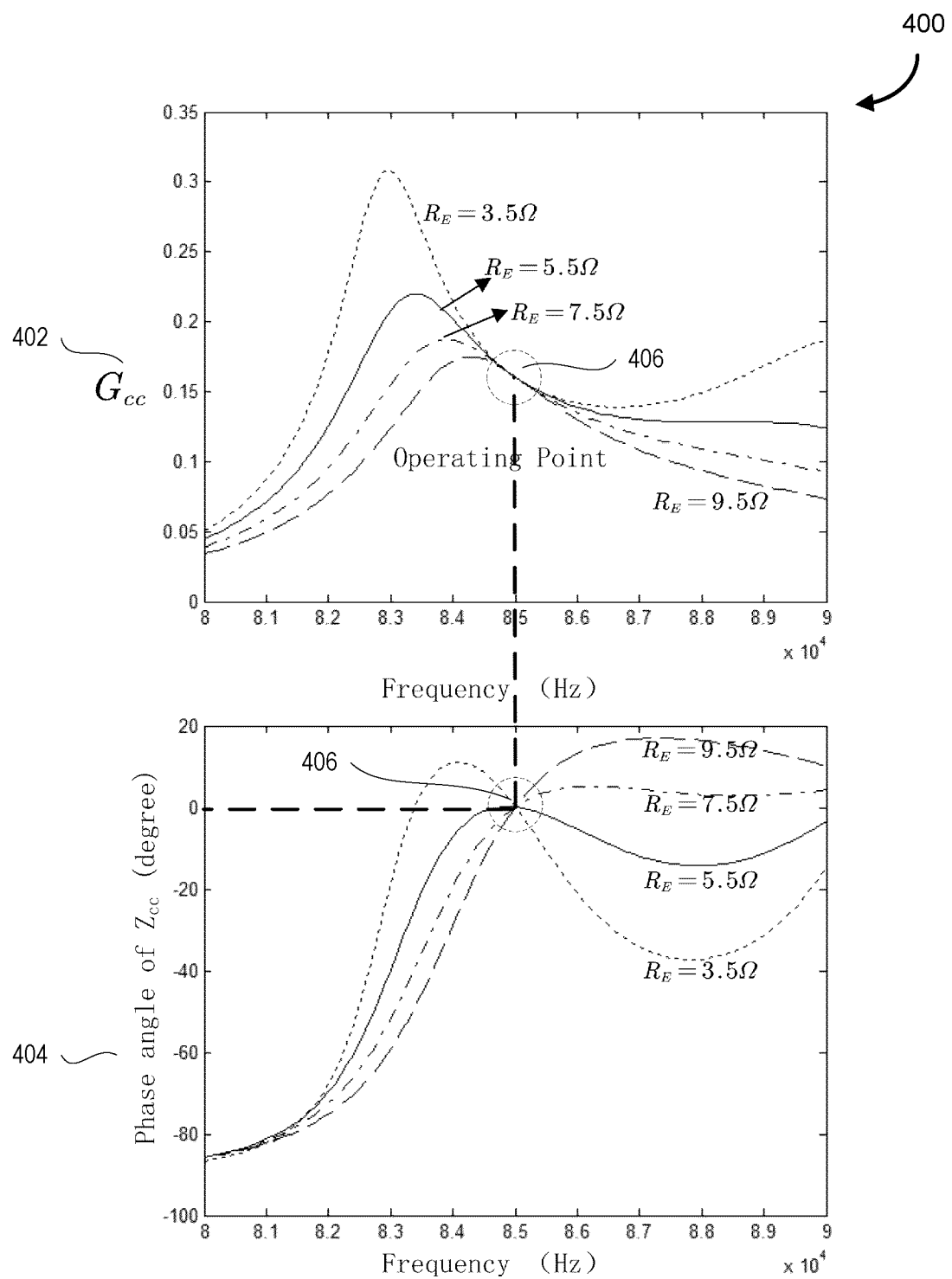
FIG. 4 is a graph showing the transconductance gain and phase angle of the input impedance for an embodiment of the WPT system for different load resistances and operating frequencies.
Figure 7:
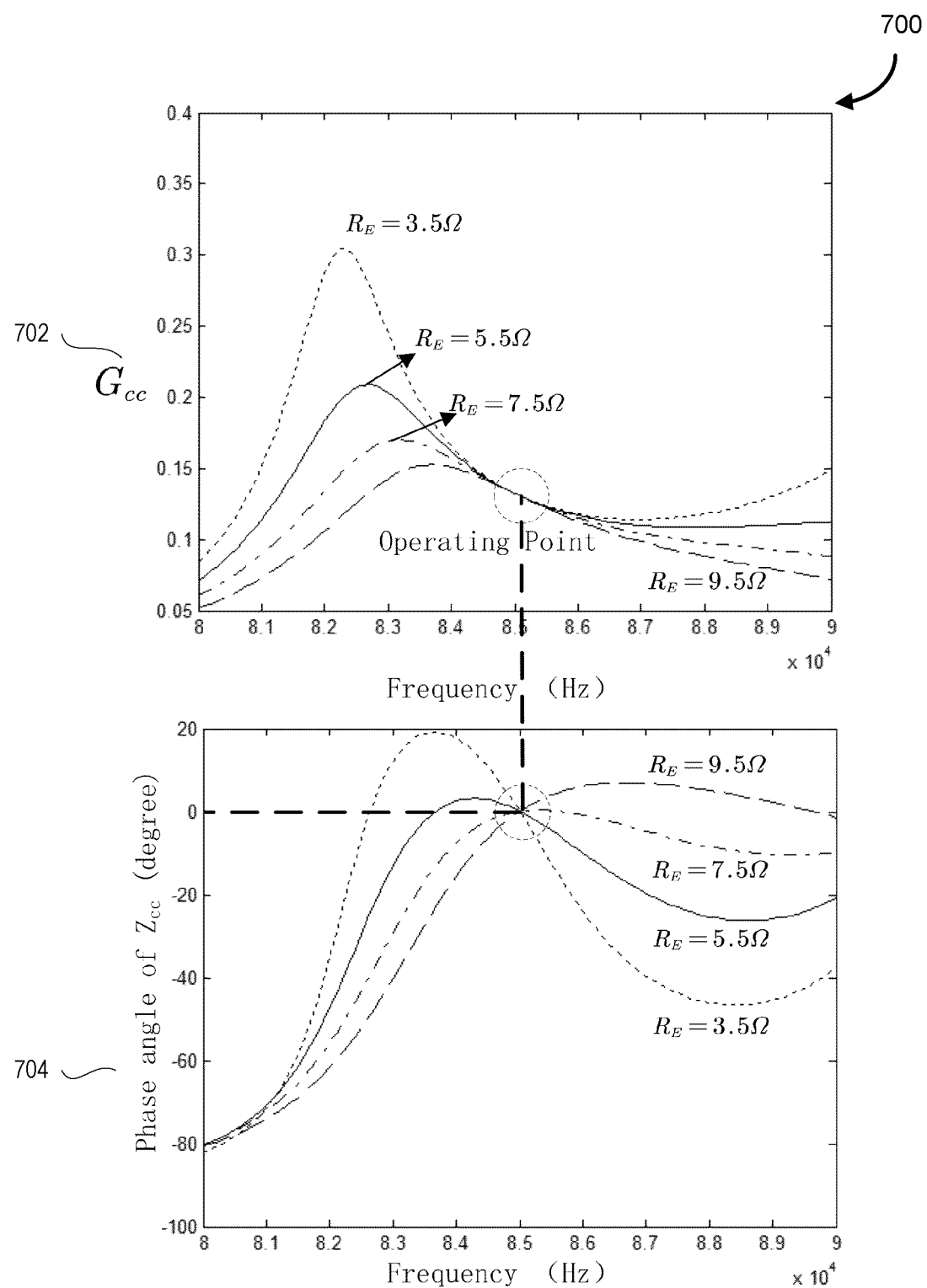

FIG. 7 is a graph showing the transconductance gain and phase angle of the input impedance for different load resistances and operating frequencies for the embodiment of the WPT system in FIG. 4, taking into account the mutual inductance between the receiver pad and the excitation coil. An operating point is shown indicating a frequency upon which the power electronics for the excitation coil are driven.

The top plot in FIG. 7 shows responses for different Re (resistance from the value of battery voltage trying to be charged and the required charging power can be simplified into a Re value). Gcc shows that at 85 KHz, one has the same transconductance gain despite different Re values, such that the ratio of output current to input voltage is constant and so to provide constant current charging (e.g., to provide a desired operating point). The second portion of FIG. 7 is an image that indicates that the phase angle of the overall input impedance for all studied Re values, which means that there is no phase shift between current and voltage, which is a desired operating state to reduce power electronics losses.

FIG. 8A and FIG. 8B are line drawings, in FIG. 8A, of an experimental EQQ transmitter WPT system and in FIG. 8B, a prototype three-coil WPT system. The three-coil WPT system is the system used for comparison with the proposed system of some embodiments.

Figure 9A:
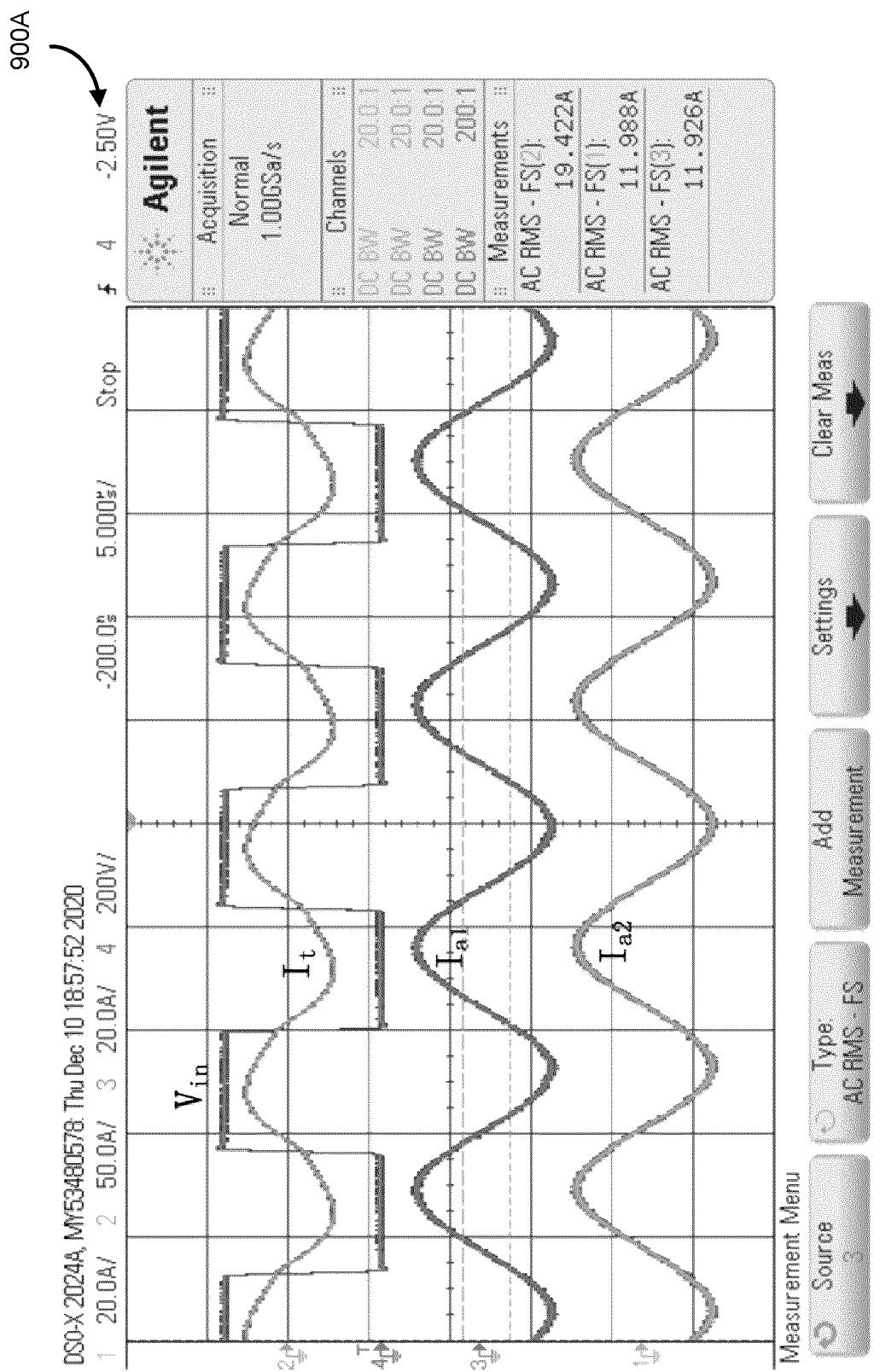
Figure 9B:
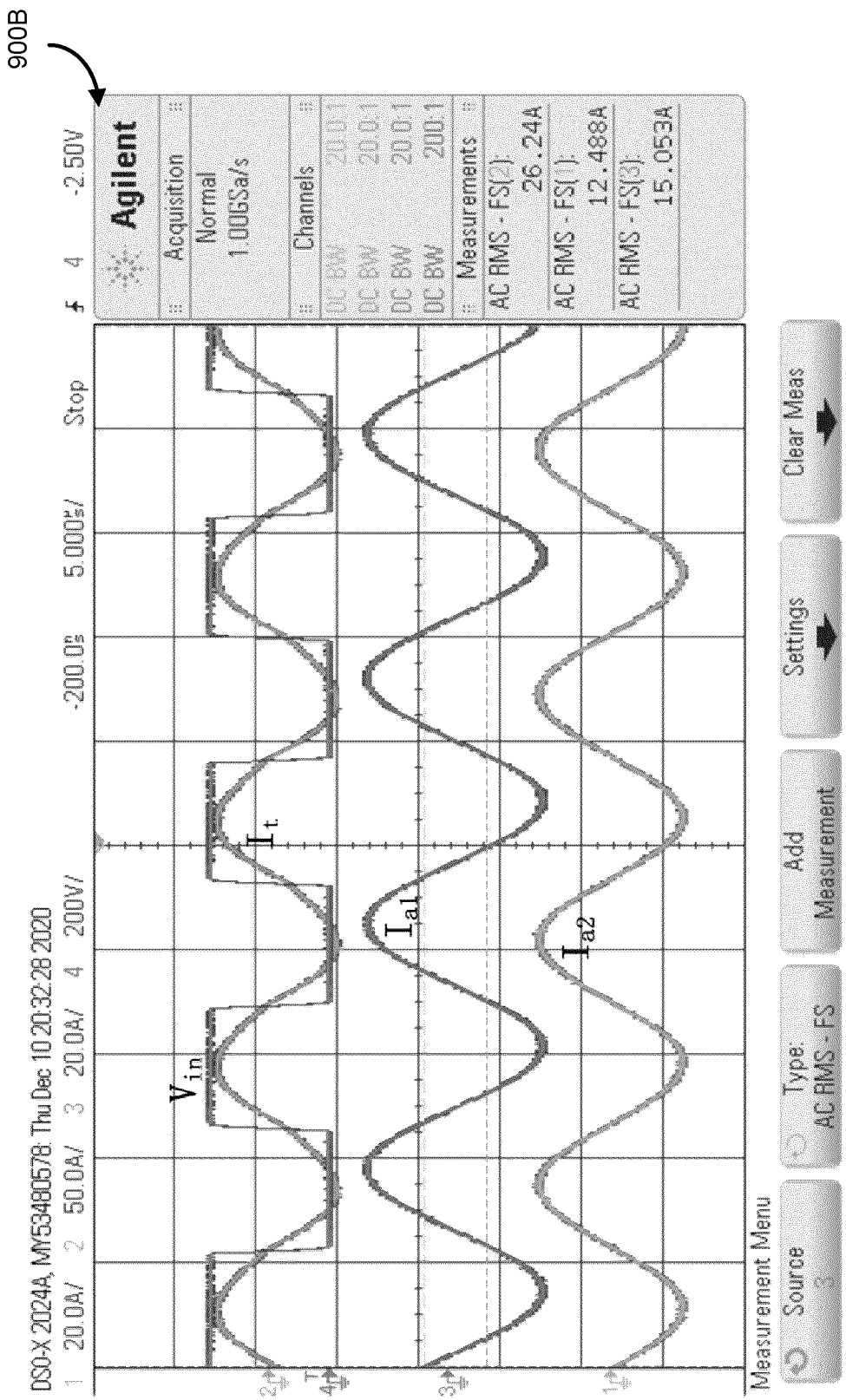

FIG. 9A and FIG. 9B are a pair of graphs showing the waveforms of the input voltage and excitation and auxiliary coil currents in an experimental EQQ transmitter WPT system. FIG. 9A shows a balanced example, where there is no misalignment. As there is zero phase shift between $V_{in}$ and $I_t$, this is a desired condition that minimizes the losses for power electronics. The two auxiliary coils in this example have a same or similar magnitude in current. FIG. 9B shows that for a 150 mm misalignment, there is still a zero phase angle between the transmitter voltage and current, and the current in auxiliary coil 2 ($I_{a2}$) is now smaller in the current in $I_{a1}$, which indicates a redistribution of current in the auxiliary coils.

Figure 10:
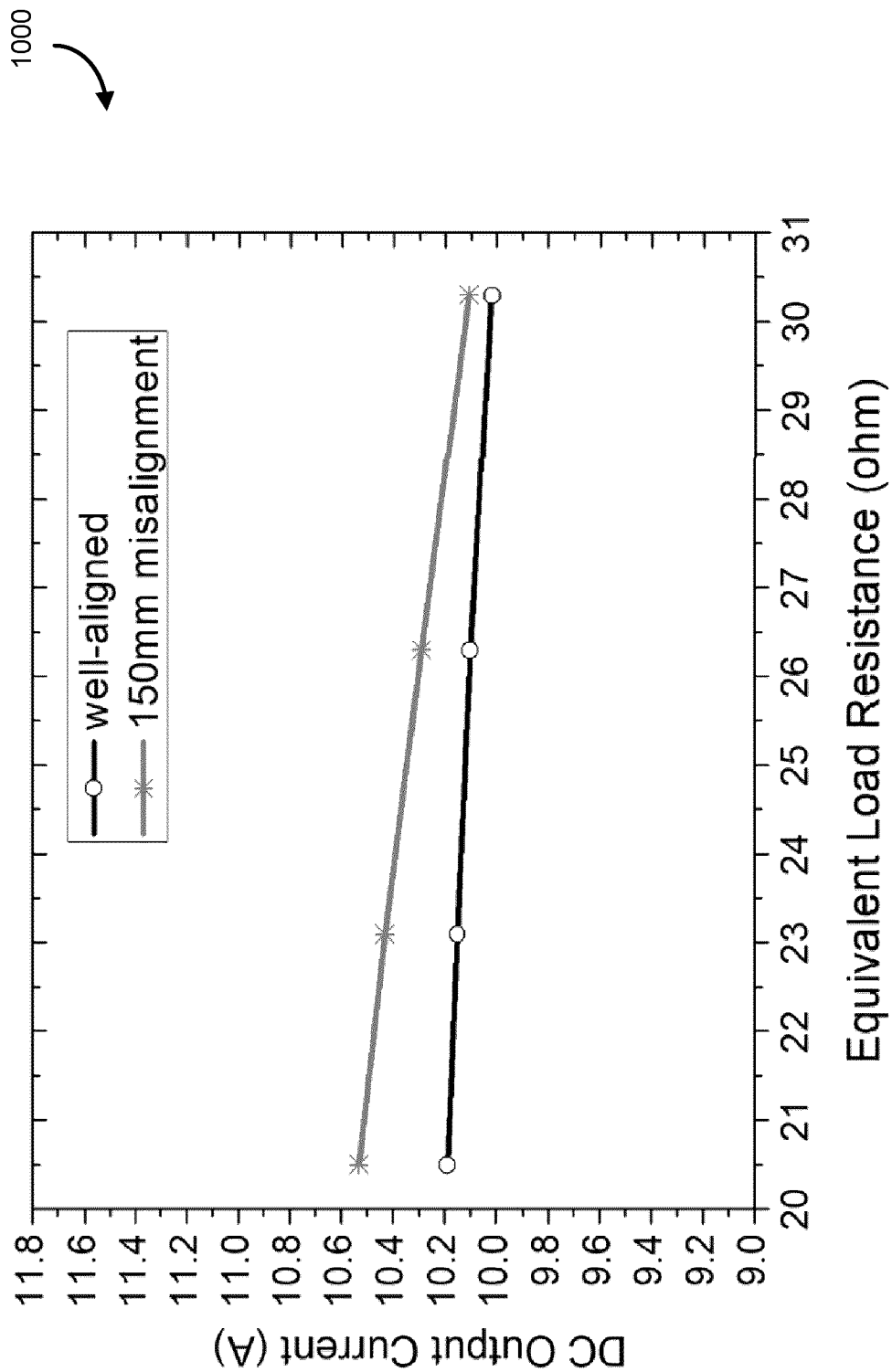

FIG. 10 is a graph showing the experimental results of the effect of changing the resistive load of an experimental EQQ transmitter WPT system on the DC output current in both the well-aligned and 150 mm lateral misalignment cases, showing that in both cases, there is a minimal variation in output current as a function of equivalent load resistance, showing that in both cases, there is constant current charging. There is slightly more variation in current for the very misaligned case, but the graph demonstrates that the charging is still occurring at a near constant current.

Figure 11:
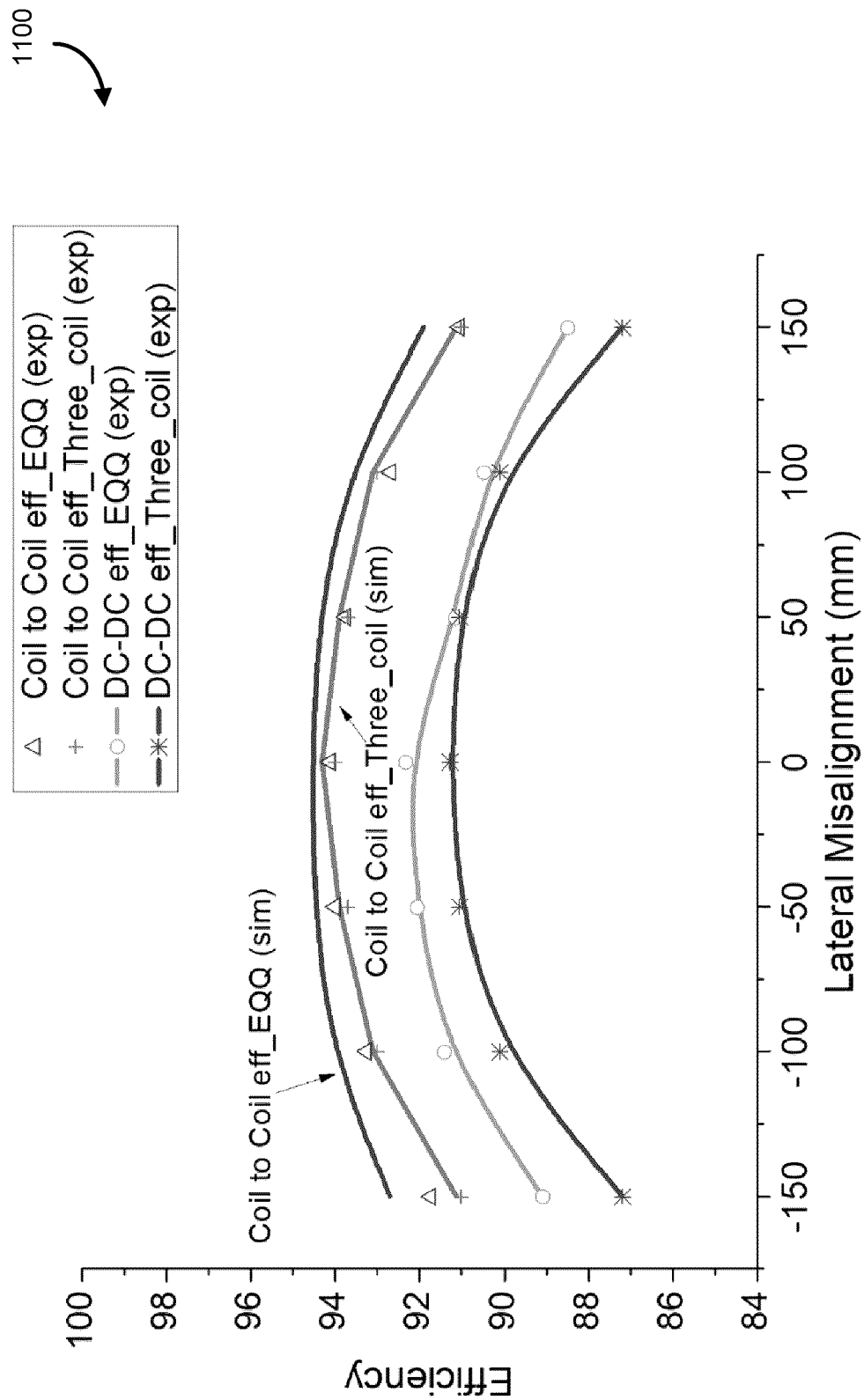

FIG. 11 is a graph showing experimental results for system efficiencies of an EQQ transmitter WPT system and a three-coil system. FIG. 11 shows that the efficiencies of the EQQ proposed system is greater than that of the three coil example comparison system. DC-DC includes the losses of power electronics both on the transmitter side and the receiver sides (e.g., rectifiers, inverters). Coil to coil is measured without the losses of power electronics—measurements are taken from each coil directly.

Figure 12:
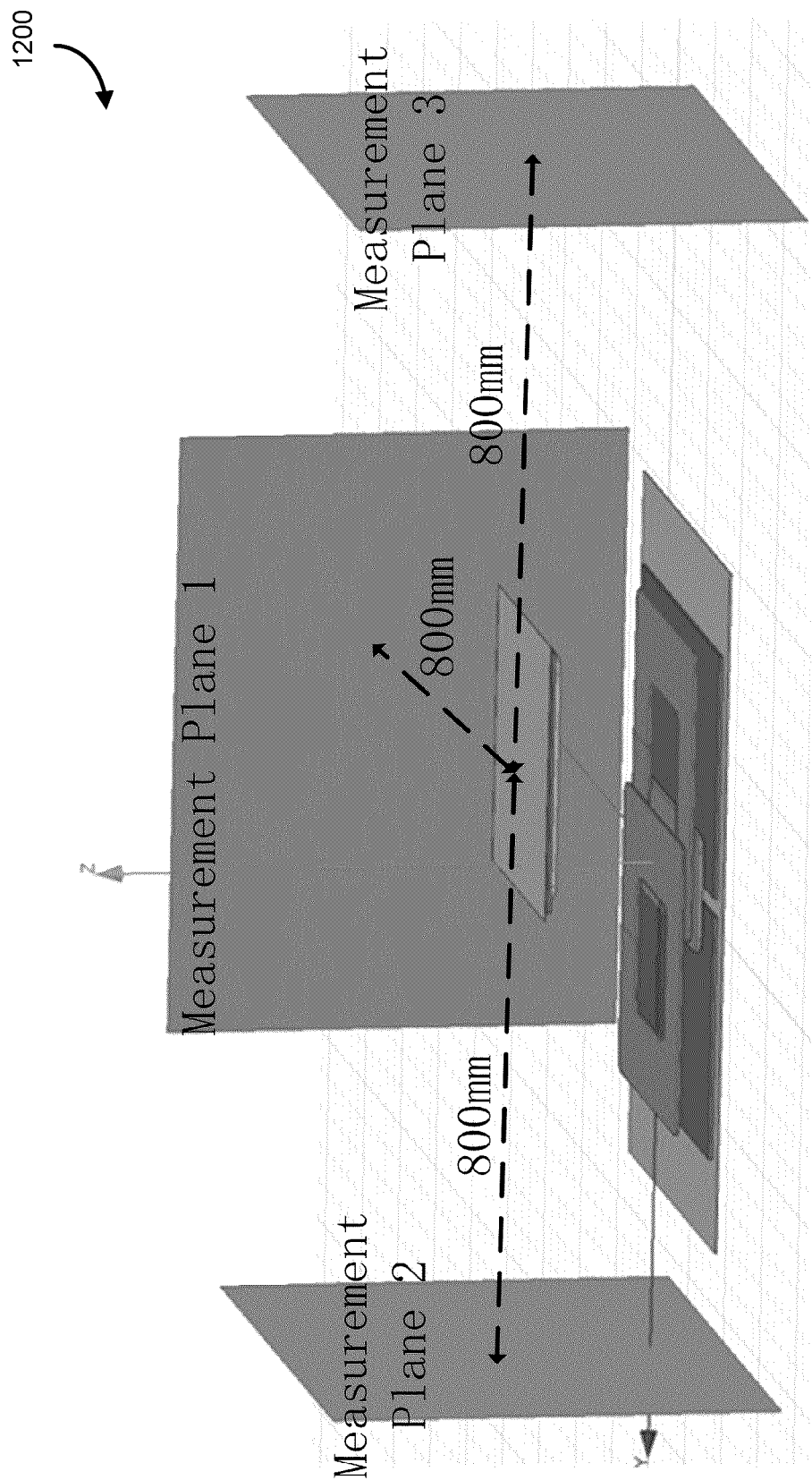

FIG. 12 is a schematic of a measurement performed to determine the leakage flux density of an experimental EQQ transmission WPT system and a three-coil WPT system.

Figure 13A:
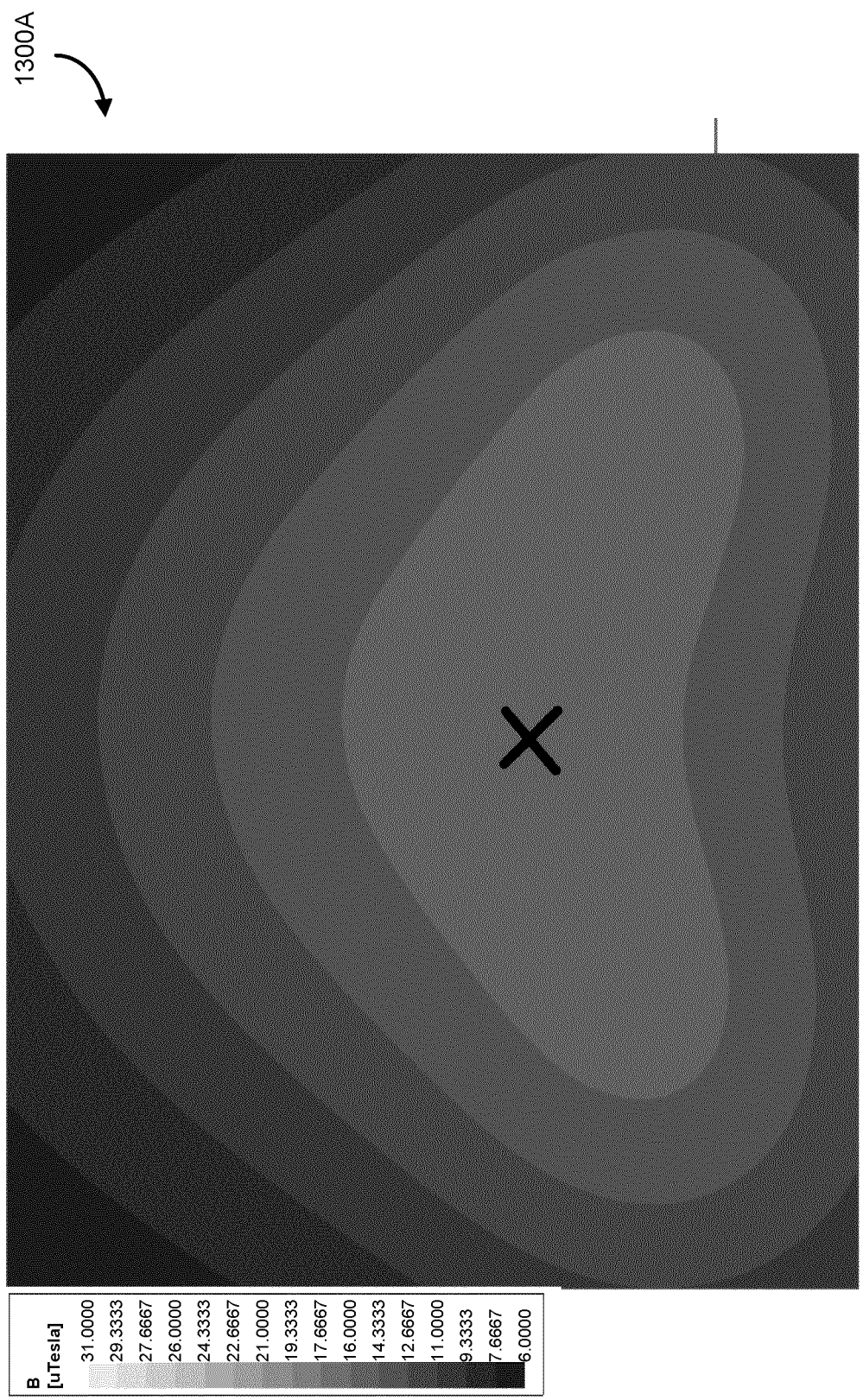
Figure 13B:
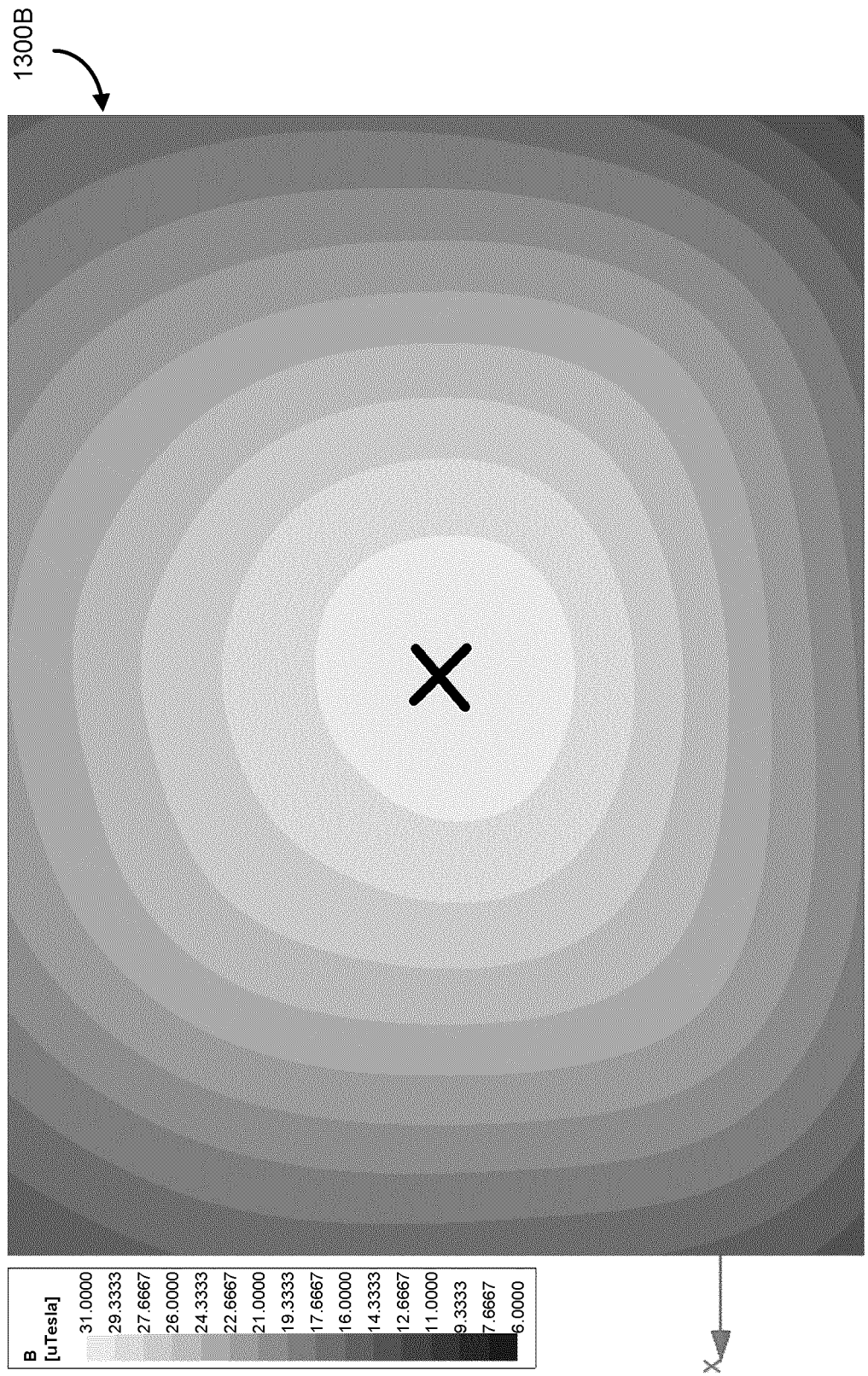

FIG. 13A and FIG. 13B are diagrams showing the leakage flux distribution of two WPT systems in measurement plane 2 of FIG. 12.

Figure 14:
Figures 15A, 15B:
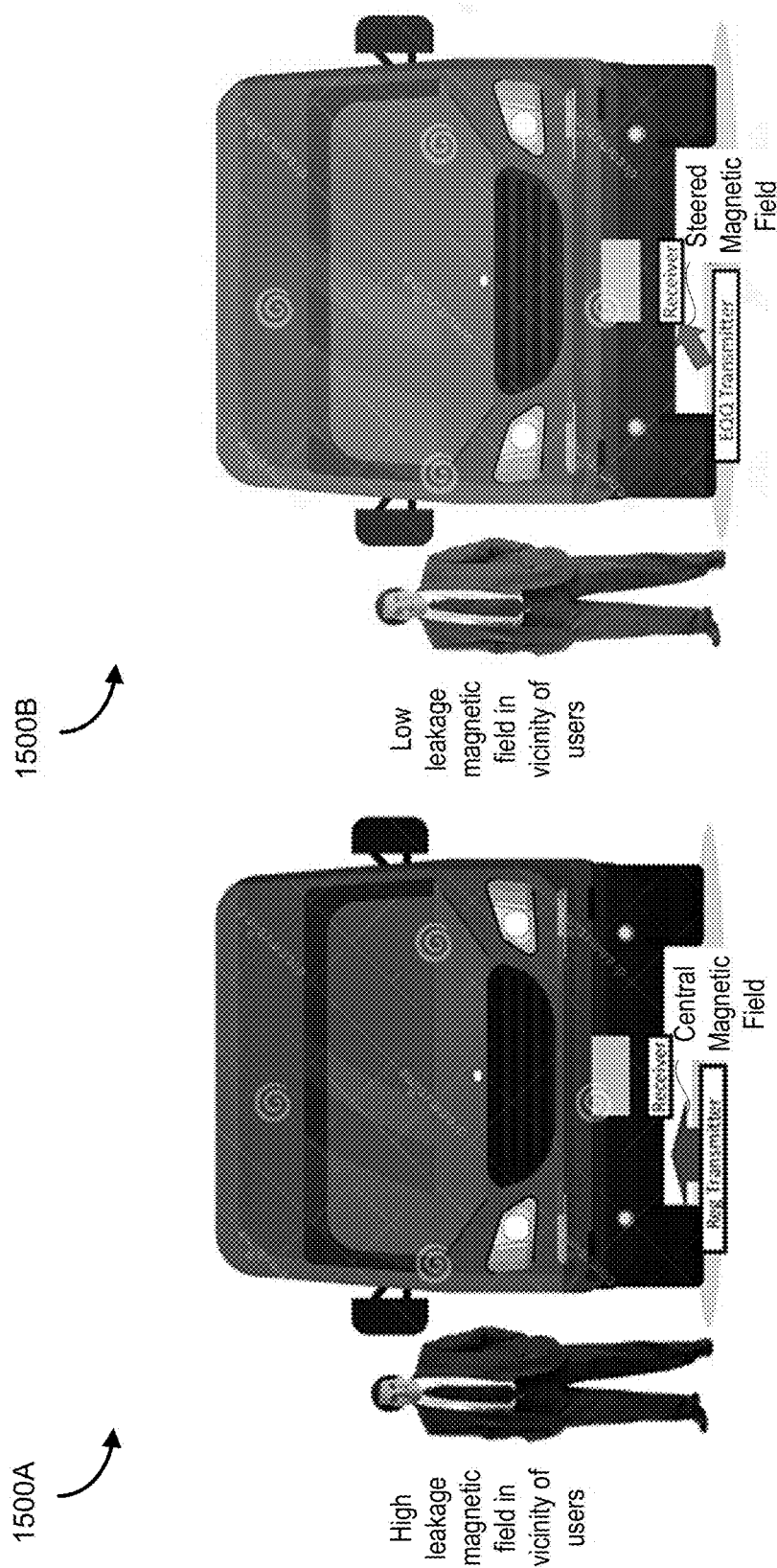

FIG. 14, FIG. 15A, and FIG. 15B are illustrations showing example implementation and magnetic field adjustments, according to some embodiments.

DETAILED DESCRIPTION

Wireless power transfer (WPT) is gaining popularity for electric vehicle (EV) charging as EVs are proliferating due to their environmental-friendly attributes. Compared to traditional plug-in charging, wireless charging has several advantages such as low electrocution risk, low maintenance cost and are suitable for automated charging of autonomous vehicles. Moreover, the user experience can be greatly improved if both wireless charging and autonomous parking are equipped in the EVs. Accordingly, improved charging infrastructure would aid in adoption of more environmentally friendly vehicle technologies, and wireless power transfer provides a technology to allow vehicle operators (e.g., drivers, autonomous systems) to charge the vehicles while the vehicle is parked or otherwise stationary. For example, a wireless charging pad may be located as a transmitter pad that is part of a parking spot, or could be moved into place while the vehicle is in position for charging (e.g., a wireless charging pad coupled to a mechanical arm that can be used while a container ship is unloading). The embodiments described herein are not limited only to vehicles, and rather, a variety of different electronic devices can be charged using the proposed wireless charging infrastructure described herein (e.g., industrial robots, standalone battery packs, robotic vacuum cleaners).

Lateral misalignment and leakage magnetic field shielding are two major technical concerns in wireless charging (e.g., for EVs). Lateral misalignment can be classified as front-to-end lateral misalignment and door-to-door lateral misalignment in the practical parking situation. Compared to front-to-end misalignment, door-to-door misalignment is more difficult for a driver to adjust, which is the major target to address in this disclosure. The leakage magnetic field in the surrounding area is also the major concern when designing a WPT system. Magnetic flux leakage can pose a danger, such as, for example, to people with pacemakers. According to the SAE J2954 standard, the intensity of the leakage magnetic flux density should be less than 27 µT (RMS) wherever people may be present. As mentioned, this operating characteristic can be dangerous, for example, for individuals who utilize pacemakers, and it would be useful to improve a safety profile of the device.

A WPT system can be categorized by the total number of coils in the whole system such as the two-coil, three-coil or four-coil system. Two-coil WPT systems can be used in the WPT systems. Many different types of pads are proposed that can transmit the power over large air gaps. For example, circular pads, square pads, double-D pads, and solenoid pads are the most notable pad structures. If a series impedance matching network is used in both the transmitter and the receiver side, the system can maintain zero phase angle (ZPA) condition when the receiver pad is misaligned. However, when the receiver pad is not well-aligned with the excitation coil, the current in the transmitter side will increase dramatically which will result in higher conduction loss and leakage magnetic flux density. A challenge with many WPT systems is that the leakage magnetic flux density causes a safety concern where high flux density can undesirably and adversely affect electronics that are positioned proximate to the transmitter pad. For example, a person may be exiting a misaligned vehicle and standing directly over a coil of the WPT system, and if there is significant leakage flux density, the person's pacemaker could be adversely affected.

Compared to the two-coil system, the multi-coil system has several advantages such as higher transmission efficiency, larger transmission distance, and magnetic field orientation. Multi-coil WPT systems can be further classified by two groups.

In the first group, each of the transmitter coils has to be energized individually like the bipolar pad, the tripolar pad and the three-phase pad.

Covic et al. first proposed the bipolar and tripolar coil topologies. These coil topologies are capable of orienting their magnetic field projection toward the receiver pad to achieve a high misalignment tolerance.

In Pathmanathan et al., a current control scheme analogous to the one in the stator windings of a three-phase, two poles electrical machine is proposed to project the magnetic flux toward the receiver pad at any lateral misalignment. However, each transmitter coil has to be equipped with one inverter in these systems resulting in an increase of system cost and control complexity.

In the second group, only one transmitter coil is energized by an inverter unit and the auxiliary coils (or intermediate coil in some papers) are used to increase the transmission distance and the transmission efficiency. So far, some of the previous research has proved that the transmission efficiency of the WPT system can be further improved when one or two auxiliary coils are used on the transmitter side.

In Sampath et al., a double-spiral repeater is proposed and integrated into the receiver pad in order to alleviate efficiency deterioration due to receiver pad misalignment. However, the leakage magnetic field and coil lateral misalignment have been scarcely discussed. In Zhang et al., a comprehensive comparative analysis between two-coil and three-coil systems is conducted. However, the leakage magnetic field is only investigated by simulations based on finite element analysis (FEA) in the low power WPT system.

Embodiments proposed herein introduce a physical WPT system with an excitation-quadrature-quadrature (EQQ) transmitter pad, adapted to address various technical problems associated with lateral misalignments, among others.

The present application is directed to an improved transmitter pad architecture, corresponding methods, computer program products. In particular, the improved transmitter pad includes a first auxiliary charging coil and a second auxiliary charging coil that interoperate together along with an excitation coil to deliver power to a corresponding receiver pad. Power delivery from the first auxiliary charging coil and the second auxiliary charging coil is controlled such that electrical power delivery is balanced as between the first auxiliary charging coil and the second auxiliary charging coil to automatically steer a magnetic flux towards a misaligned (e.g., laterally misaligned) pad, such as a receiver pad coupled to a vehicle whose parking positioning has some misalignment. This is also helpful where the receiver pad is offset on the vehicle (e.g., not across the center plane) due to various design or volume constraints (e.g., competing with other onboard electronics for space). For non-parking spot applications (e.g., transmitter coil on a moveable arm), other types of misalignments can also be contemplated and the system can attempt to steer the magnetic flux to overcome these challenges.

In particular, the first auxiliary charging coil and the second auxiliary charging coil are positioned such that the first auxiliary charging coil and the second auxiliary charging coil overlap to decouple or significantly reduce coupling as between each of the first auxiliary charging coil and the second auxiliary charging coil with one another.

Each of the first auxiliary charging coil and the second auxiliary charging coil are coupled to a central excitation coil, and the excitation coil is not coupled to the receiver coil. The first auxiliary charging coil and the second auxiliary charging coil are controlled to maintain a zero phase shift between the excitation voltage and the current such that the currents naturally adjust based on the lateral misalignment without requiring an intervention mechanism to help guide the power delivery.

There can be more than two auxiliary charging coils, in some embodiments. In another embodiment, there is only a first auxiliary charging coil and only a first second auxiliary charging coil (e.g., only two coils in this embodiment).

The excitation coil is inductively coupled to each of the two quadrature auxiliary coils such that driving a current through the excitation coil induces an electrical current in each of the two quadrature auxiliary coils. There is an overlap area of two quadrature auxiliary coils to ensure they are decoupled. The excitation coil is placed close beneath two quadrature auxiliary coils. In an embodiment, all of the coils in the system use compensation capacitors (e.g., series compensation capacitors, or with variations thereof, such as parallel compensation capacitors on one coil and series on another, vice versa, or parallel compensation on both sides, compensation network consisting of arrangements of inductors and capacitors on each coil, some coils). The compensation capacitors are carefully selected to achieve electrical symmetry of the transmitter architecture, and Applicants experimentally validated some embodiments to demonstrate improved technical benefits relating to system efficiency and reduced leakage flux.

The system operates as part of a wireless charging system. For example, the system may operate as part of an autonomous charging system for electric vehicles. Other usage situations are considered as well, such as for charging electronic components generally (e.g., using a mechanical arm coupled to the transmitter pad), or for charging electronic devices which are simply placed overtop or proximate to the transmitter pad (e.g., an electric generator or a battery that can be placed into a charging location by hand).

In use, the transmitter pad is configured to interoperate with a receiver pad containing a receiver coil, to perform steps of a method including, but not limited to, driving a current through the excitation coil, inducing an electrical current in each of the two quadrature auxiliary coils, and inducing a current in the receiver coil. The positioning of the excitation coil and the two auxiliary quadrature coils is such that electrical power is balanced as between the first quadrature auxiliary coil and the second quadrature auxiliary charging coil to effectively steer the magnetic flux automatically to adapt to a receiver where there is lateral misalignment between the transmitter pad and the receiver pad.

Several advantages can be achieved with the disclosed EQQ transmitter WPT system compared to the existing coil topologies. First, the proposed coil topology can achieve constant current (CC) charging and ZPA condition for lateral misalignment below 150 mm without using additional control circuitry or switching capacitors. Second, only one inverter unit is needed in the EQQ transmitter WPT system, which can reduce the cost and control complexity. Third, the current distribution in the two quadrature auxiliary coils adjusts autonomously according to the x-direction misalignment of the receiver pad (in a further variation, three overlapped coils can be used together in a proposed embodiment that have a geometry that can be utilized to account for x-direction and y-direction misalignments, simultaneously). This means that the auxiliary coil having the higher mutual inductance with the receiver pad conducts higher current for a specific lateral misalignment case. This phenomenon can effectively reduce the leakage magnetic flux density on the side of the less-coupled auxiliary coil.

In some embodiments, the excitation coil can be much smaller than the auxiliary coils. Therefore, the coupling coefficient between the excitation coil and the receiver pad can be neglected to simplify the design process.

Figure 1:
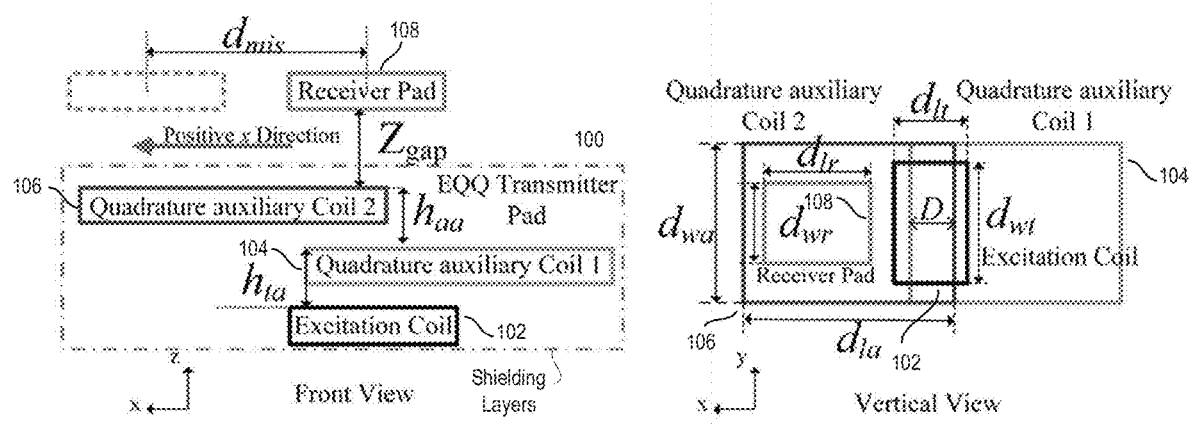
FIG. 1 is a schematic diagram showing front and vertical views of an example wireless power transfer system.

FIG. 1 is a schematic diagram showing front and vertical views of an example wireless power transfer system 100. The system 100 includes an excitation coil 102, a first quadrature auxiliary coil 104, and a second quadrature auxiliary coil 106.

The excitation coil 102 has width $d_{wt}$ and length $d_{lt}$. The first quadrature auxiliary coil 104 and the second quadrature auxiliary coil 106 each have width $d_{wa}$ and length $d_{la}$. In alternative embodiments the dimensions of the first quadrature auxiliary coil 104 may not be the same as the dimensions of the second quadrature auxiliary coil 106.

The first quadrature auxiliary coil 104 is positioned above the excitation coil 102 such that the top of the first quadrature auxiliary coil 104 is separated from the top of the excitation coil 102 by displacement $h_{ta}$.

The second quadrature auxiliary coil 106 is positioned above the first quadrature auxiliary coil 104 such that the top of the second quadrature auxiliary coil 106 is separated from the top of the first quadrature auxiliary coil 104 by displacement $h_{aa}$.

The first quadrature auxiliary coil 104 is displaced from the second quadrature auxiliary coil 106 along the x-axis, such that the there is a displacement D between the leftmost edge of the first quadrature auxiliary coil 104 and the rightmost edge of the second quadrature auxiliary coil 106. The first quadrature auxiliary coil 104 and the second quadrature auxiliary coil 106 overlap one another (e.g., from a vertical view perspective) so that the coils 104 and 106 are electrically coupled to one another.

In operation, the system 100 is positioned below a receiver pad 108. The bottom of the receiver pad is separated from the top of the second quadrature auxiliary coil 106 by displacement $Z_{gap}$.

The excitation coil 102 is inductively coupled to each of the first quadrature auxiliary coil 104 and the second quadrature auxiliary coil 106 and both the first quadrature auxiliary coil 104 and the second quadrature auxiliary coil 106 are inductively coupled to the receiver pad 108. When an electrical current is driven through the excitation coil 102, excitation coil 102 induces a current in each of the first quadrature auxiliary coil 104 and the second quadrature auxiliary coil 106. In turn, both the first quadrature auxiliary coil 104 and the second quadrature auxiliary coil 106 induce an electrical current in the receiver pad 108.

The receiver pad 108 may not be aligned with the excitation coil 102 along the x-axis. For example, the receiver pad 108 may be displaced along the x-axis by displacement $d_{mis}$. The $d_{mis}$ can occur in various situations—for example, a person may have parked an EV diagonally or simply out of alignment with the center of a parking spot.

When the receiver pad is displaced positively along the x-axis, the mutual inductance between the excitation pad 102 and the first quadrature auxiliary coil 104 decreases and mutual inductance between the excitation pad 102 the second quadrature auxiliary coil 106 increases such that less current is driven through the first quadrature auxiliary coil 104 and more current is driven through the second quadrature auxiliary coil 106.

In an embodiment, a wireless communications circuit further added that is configured to receive one or more data sets representative of a state of charge (e.g., battery level, battery charge requirements) of an energy source coupled to the receiver pad, and the one or more data sets are utilized to control one or more characteristics of energy provided by the transmitter pad. For example, the operation of the excitation coil can thus be controlled to deliver different amounts of power.

In another embodiment, the wireless charging system is further configured to provide both power and communicate signal through the inductive interface between the receiver pad and the transmitter pad. For example, a signal may be modulated in the form of a frequency or an amplitude modulation signal, and the signal may provide data transfer in some embodiments, or in other embodiments, provide the one or more data sets representative of a state of charge, obviating the need for or supplementing the wireless communications circuit.

Figure 2:
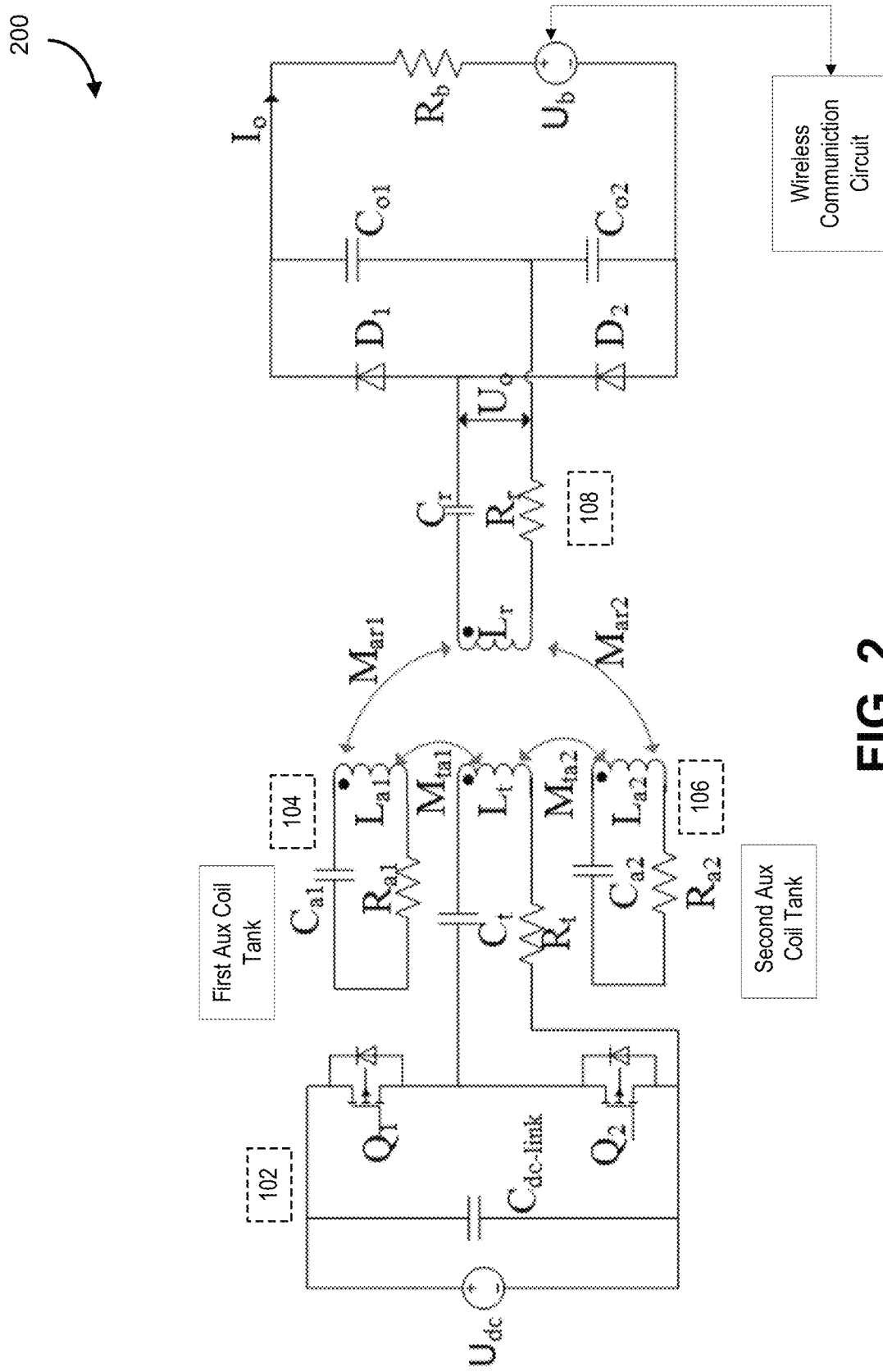
FIG. 2 is an equivalent circuit diagram of an EQQ transmitter WPT system according to some embodiments.

FIG. 2 is the equivalent circuit diagram 200 of an EQQ transmitter WPT system according to some embodiments.

The system in FIG. 2 includes an dc power supply $U_{dc}$, a dc-link capacitor $C_{dc\text{-}link}$, an half-bridge inverter comprises of $Q_1$, $Q_2$, four resonant tanks which include an excitation coil, two quadrature auxiliary coils and a receiver pad as well as their associated series-link compensation capacitors. On the receiver side, a voltage doubler instead of a full-bridge rectifier is used to reduce the currents in the excitation and the auxiliary coils. $M_{ta1}$ and $M_{ta2}$ represent the mutual inductance between the excitation coil and two auxiliary coils, while $M_{ar1}$ and $M_{ar2}$ indicate the mutual inductance between the receiver pad and two quadrature auxiliary coils.

Figure 3:
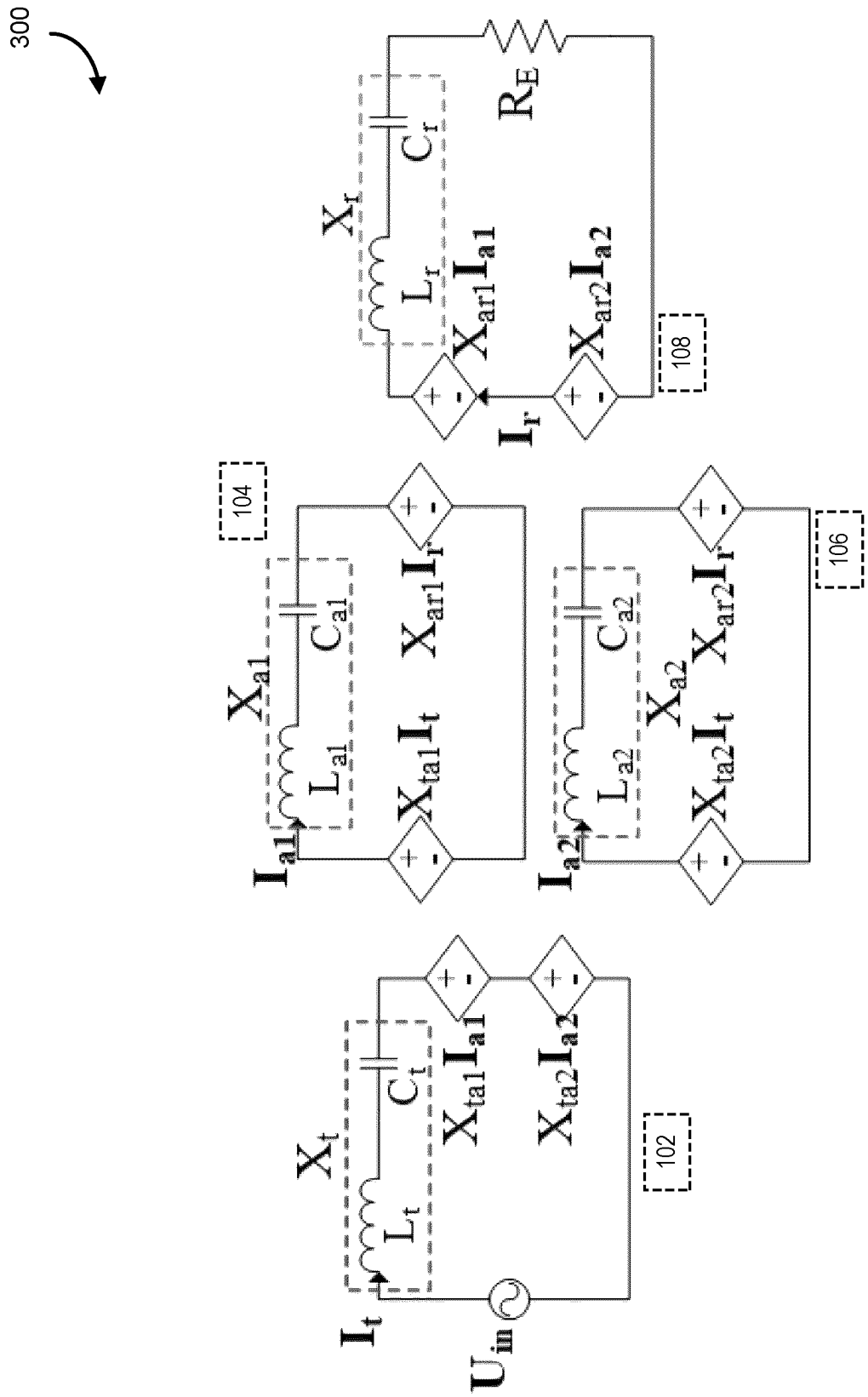
FIG. 3 is a simplified equivalent circuit diagram of an EQQ transmitter WPT system according to some embodiments.

In order to simplify the analysis of the EQQ transmitter WPT system, the fundamental harmonic approximation (FHA) can be applied and the parasitic resistance of each coil can be neglected. FIG. 3 is a diagram of a simplified model of an EQQ transmitter WPT system. This simplified model can be used for steady-state analysis.

In this simplified circuit model, the dc power supply and the half bridge inverter are simplified as AC voltage source while the voltage doubler and the battery are converted into an equivalent resistive load. The equivalent resistance is determined via fundamental frequency approximation, where $U_o$ of FIG. 2 has a reflected rms voltage of $$\frac{\sqrt{2}\,U_b}{\pi},$$

and the equivalent resistance can be obtained as the following form based on the desired output power, $P_o$:

$$R_E = \frac{U_o^2}{P_o} = \frac{2U_b^2}{\pi^2 P_o} \tag{1}$$

From the simplified circuit model 300 in FIG. 3, the system equations can be represented through a 4-by-4 matrix (all the parameters highlighted in bold are phasors):

$$\begin{bmatrix} U_{in} \\ 0 \\ 0 \\ 0 \end{bmatrix} = \begin{bmatrix} X_t & X_{ta1} & X_{ta2} & 0 \\ X_{ta1} & X_{a1} & 0 & X_{ar1} \\ X_{ta2} & 0 & X_{a2} & X_{ar2} \\ 0 & X_{ar1} & X_{ar2} & X_r + R_E \end{bmatrix} \begin{bmatrix} I_t \\ I_{a1} \\ I_{a2} \\ I_r \end{bmatrix} \tag{2}$$

where $\omega = 2\pi f$ indicates the operating angular frequency; $X_t$, $X_{a1}$, $X_{a2}$, $X_r$ are defined as the equivalent impedances of the four corresponding coil loops shown in FIG. 3. Meanwhile, $X_{ta1}$, $X_{ta2}$, $X_{ar1}$, $X_{ar2}$ are the equivalent impedances of the mutual inductances between the coupled coils shown in FIG. 2 respectively. Based on the above mentioned definitions, all the impedances can be written as follows:

$$\begin{cases} X_t = j\omega L_t + \dfrac{1}{j\omega C_t}, \\ X_{a1} = j\omega L_{a1} + \dfrac{1}{j\omega C_{a1}}, \\ X_{a2} = j\omega L_{a2} + \dfrac{1}{j\omega C_{a2}}, \\ X_r = j\omega L_r + \dfrac{1}{j\omega C_r}, \\ X_{ta1} = j\omega M_{ta1}, \\ X_{ta2} = j\omega M_{ta2}, \\ X_{ar1} = j\omega M_{ar1}, \\ X_{ar2} = j\omega M_{ar2} \end{cases} \tag{3}$$

where $L_t$, $L_{a1}$, $L_{a2}$ and $L_r$ are the self-inductances of the excitation coil, the first quadrature auxiliary coil 1, the second quadrature auxiliary coil 2 and the receiver pad respectively. $M_{ta1}$, $M_{ta2}$, $M_{ar1}$ and $M_{ar2}$ are the mutual inductances between the coupled coils shown in FIG. 2 respectively.

Based on (2), by inverting the impedance matrix, the corresponding voltage and current relationships can be achieved as:

$$I_t = U_{in} \cdot \frac{-X_{a1}X_{a2}X_r + X_{ar1}^2 X_{a2} + X_{ar2}^2 X_{a1} - X_{a1}X_{a2}R_E}{A + BR_E} \tag{4}$$

$$I_r = U_{in} \cdot \frac{-X_{ta1}X_{ar1}X_{a2} - X_{ta2}X_{ar2}X_{a1}}{A + BR_E} \tag{5}$$

where the symbol notations A and B in (4) and (5) are expressed as follows:

$$A = -X_t X_r X_{a1} X_{a2} + X_r(X_{ta1}^2 X_{a2} + X_{ta2}^2 X_{a1}) + X_t(X_{a2}X_{ar1}^2 + X_{a1}X_{ar2}^2) - (X_{ar1}X_{ta2} - X_{ar2}X_{ta1})^2 \tag{6}$$

$$B = -X_t X_{a1} X_{a2} + X_{ta1}^2 X_{a2} + X_{ta2}^2 X_{a1} \tag{7}$$

The CC charging mode can be achieved regardless of the variation of the load $R_E$ by designing the parameters in the EQQ transmitter system. The transconductance gain $G_{cc}(\omega)$ is defined as the absolute value of the ratio of the output current $I_r$ to the input voltage $U_{in}$. According to (5), $G_{cc}(\omega)$ can be derived as:

$$G_{cc}(\omega) = \left| \frac{-X_{ta1}X_{ar1}X_{a2} - X_{ta2}X_{ar2}X_{a1}}{A + BR_E} \right| \tag{8}$$

It can be seen from (8) that $G_{cc}(\omega)$ is independent of the load resistance when the term B in (7) is equal to zero. Therefore, the CC charging mode condition in the EQQ transmitter WPT system can be obtained as follows:

$$X_t = \frac{X_{ta1}^2 X_{a2} + X_{ta2}^2 X_{a1}}{X_{a1} X_{a2}} \tag{9}$$

By substituting (9) and (6) into (4), the total input impedance of the EQQ transmitter WPT system can be obtained as:

$$Z_{cc}(\omega) = \frac{U_{in}}{I_t} = \frac{A}{-X_{a1}X_{a2}X_r + X_{ar1}^2 X_{a2} + X_{ar2}^2 X_{a1} - X_{a1}X_{a2}R_E} \quad (10)$$

If $Z_{cc}(\omega)$ also only has a real component, the system can achieve ZPA. In (10), the term A only has a real component based on (6). Therefore, the denominator of (10) should also only have a real component, which suggests that:

$$X_r = \frac{X_{ar1}^2 X_{a2} + X_{ar2}^2 X_{a1}}{X_{a1}X_{a2}}. \quad (11)$$

If the above equation is satisfied, the denominator in (10) only has the term $-X_{a1}X_{a2}R_E$, which is a real value.

FIG. 4 is a graph 400 showing the transconductance gain 402 and phase angle of the input impedance 404 for an embodiment of the WPT system for different load resistances and operating frequencies. As can be seen in FIG. 4, there exists an operating frequency 406 at which the phase angle is zero and the transconductance gain do not change based on the load resistance. This is a desirable operating frequency 406 as it delivers both CC charging and zero voltage switching in the transmitter power electronics.

Based on (4) and (5), the following relationship between $I_t$ and $I_r$ can be obtained if (9) and (11) are satisfied:

$$\frac{I_t}{I_r} = \frac{X_{a1}X_{a2}R_E}{X_{ta1}X_{ar1}X_{a2} + X_{ta2}X_{ar2}X_{a1}}. \quad (12)$$

It is worth noticing that the numerator in (12) is a real number while the denominator is an imaginary number, which suggests that there is a 90-degree phase shift between $I_t$ and $I_r$.

According to the system matrix in (2), the current flowing in the two auxiliary coils are derived as follows:

$$I_{a1} = \frac{-(X_{ta1}I_t + X_{ar1}I_r)}{X_{a1}} \quad (13)$$

$$I_{a2} = \frac{-(X_{ta2}I_t + X_{ar2}I_r)}{X_{a2}}. \quad (14)$$

Assuming that $i_t = I_t \sin(\omega t)$ and $i_r = I_r \cos(\omega t)$, the above equations can be rewritten as:

$$i_{a1} = \frac{\sqrt{(X_{ta1}I_t)^2 + (X_{ar1}I_r)^2}}{X_{a1}} \sin(\omega t + \varphi_1 + \pi) \quad (15)$$

$$i_{a2} = \frac{\sqrt{(X_{ta2}I_t)^2 + (X_{ar2}I_r)^2}}{X_{a2}} \sin(\omega t + \varphi_2 + \pi) \quad (16)$$

where $\tan\varphi_1 = (X_{ar1}I_r)/(X_{ta1}I_t)$ and $\tan\varphi_2 = (X_{ar2}I_r)/(X_{ta2}I_t)$.

If there is a lateral misalignment between the receiver pad and the auxiliary coil, $M_{ar1}$ and $M_{ar2}$ have different variation trends. For instance, when the receiver pad has a lateral misalignment along the negative x direction shown in FIG. 1, $M_{ar1}$ will increase whereas $M_{ar2}$ will decrease. In this case, $I_r$ is a constant value in CC charging mode while $I_t$ will increase due to the decrease of the total input impedance, $Z_{cc}$ caused by the lateral misalignment as the same output power is still achieved.

As a result, the amplitude of $I_{a1}$ increases because both $I_t$ and $X_{ar1}$ increase given that the other parameters like $X_{ta1}$, $X_{a1}$ and $I_r$ are unchanged. In terms of the amplitude of $I_{a2}$, it has a different variation trend compared with $I_{a1}$ due to the decrease in $X_{ar2}$. The term $X_{ta2}I_t$ increases while the term $X_{ar2}I_r$ declines in the lateral misalignment case on the premise that $X_{ta2}$ and $I_r$ are constant. As a result, the amplitude of $I_{a2}$ will decrease first and then begin to increase as the lateral misalignment increases along the negative x direction. This current distribution has a benefit in reducing the leakage flux density in the surrounding area compared with a three-coil WPT system.

Thus, the EQQ transmitter automatically drives a higher current in the auxiliary coil which is closer to the receiver, and a smaller current in the auxiliary coil which is further away from the receiver. Given that the receiver is attached to the underside of the chassis of a vehicle, the auxiliary coil which is further away from the receiver will be closer to the edge of the chassis and will thus contribute more towards the generation of leakage magnetic flux density. As a result, the ability of the EQQ transmitter to reduce the current in the auxiliary coil which is further away from the receiver will reduce leakage magnetic fields.

Figure 5:
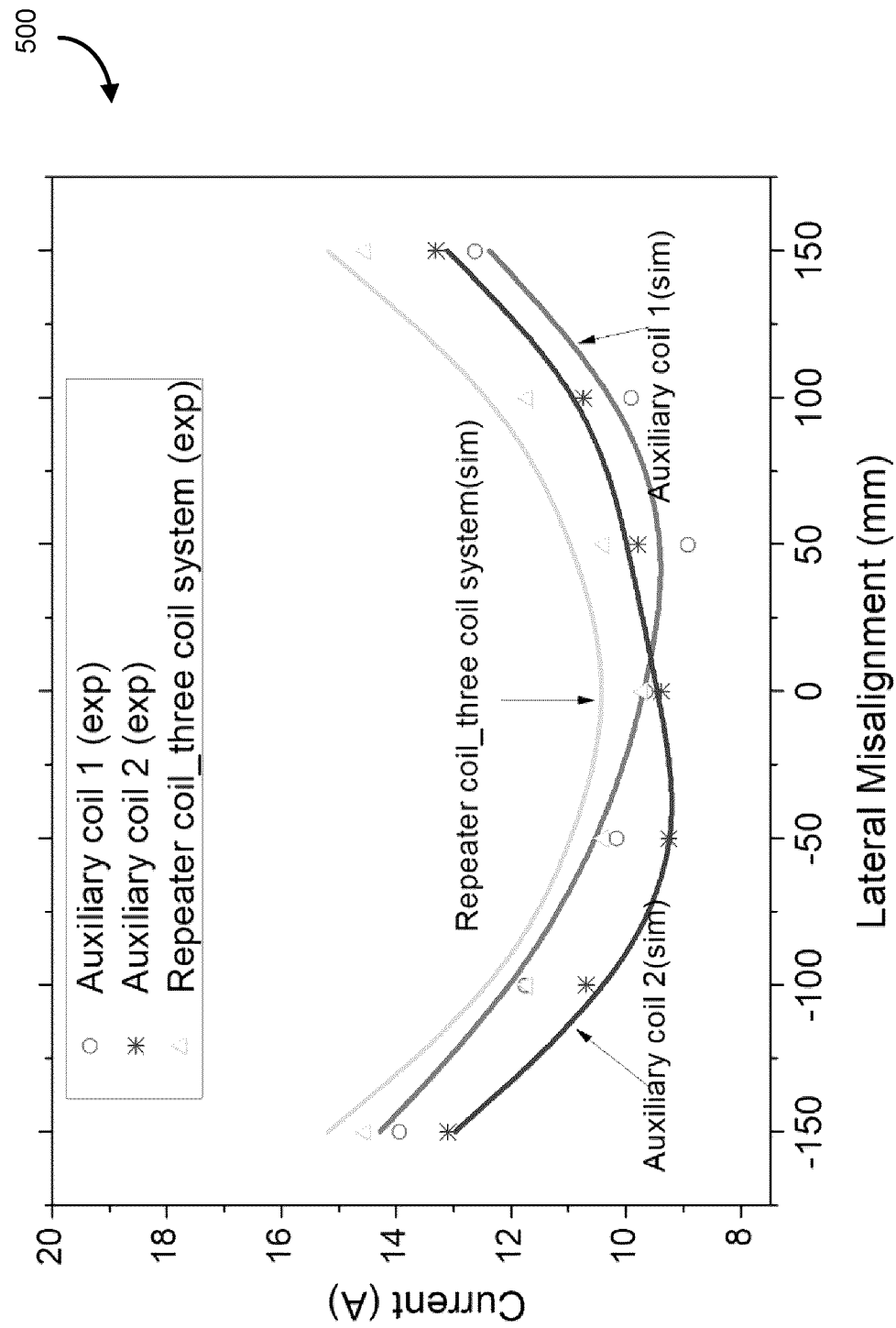
FIG. 5 is a graph comparing the current variations of an embodiment of the disclosed EQQ transmitter WPT system and an existing three-coil system in different misalignment cases.

FIG. 5 is a graph 500 comparing the current variations of an embodiment of the disclosed EQQ transmitter WPT system and an existing three-coil system in different misalignment cases.

In order to make a fair comparison, both the existing three-coil system and the proposed EQQ transmitter WPT system of some embodiments use the identical excitation coil and receiver pad. The repeater coil in the three-coil system also has the approximate copper area compared with two quadrature auxiliary coils in the EQQ transmitter system.

According to the series marked by asterisks and circles, the current in the first auxiliary coil increases faster than that in the second auxiliary coil when the receiver pad moves towards −150 mm misalignment. Similarly, the current in the second auxiliary coil increases faster than that in the first auxiliary coil when the receiver pad has 150 mm misalignment. These suggest that the quadrature auxiliary coil which has stronger coupling with the receiver pad conducts more current compared with the other quadrature auxiliary coil.

Based on the current distribution obtained in FIG. 5 in the 150 mm lateral misalignment case, the magnetic field distributions in both the existing three-coil system and the proposed EQQ transmitter WPT system are shown in FIGS. 6A and FIG. 6B by using the FEM tool Maxwell 3D. FIG. 6A and FIG. 6B are two graphs 600A, 600B showing the magnetic field distribution in (a) a three-coil system compared in FIG. 5 at 150 mm lateral misalignment and (b) the embodiment of the of the disclosed EQQ transmitter WPT system compared in FIG. 5 at 150 mm lateral misalignment.

It is evident that the magnetic flux density in the FIG. 6A is more intensive than the one shown in FIG. 6B, which demonstrates that the current distribution pattern in the EQQ transmitter WPT system can reduce the leakage magnetic field, especially in area on the right side of FIG. 6B. This is an area where humans may be present and in FIG. 6A, a strong field is shown there, whereas in FIG. 6B the field is weaker and thus potentially safer. The proposed approach is useful in providing a technical solution whereby the magnetic fields are directionally biased to adapt for lateral misalignments.

In some embodiments, the size of the excitation coil may be large enough that the mutual inductance between the excitation coil and the receiver pad cannot be neglected. In some other embodiments, the receiver pad may be positioned too close to the excitation coil such that the mutual inductance between them cannot be neglected.

When the mutual inductance between the excitation coil and the receiver pad is taken into account, the system matrix shown in (2) can be rewritten as:

$$\begin{bmatrix} U_{in} \\ 0 \\ 0 \\ 0 \end{bmatrix} = \begin{bmatrix} X_t & X_{ta1} & X_{ta2} & X_{tr} \\ X_{ta1} & X_{a1} & 0 & X_{ar1} \\ X_{ta2} & 0 & X_{a2} & X_{ar2} \\ X_{tr} & X_{ar1} & X_{ar2} & X_t + R_E \end{bmatrix} \begin{bmatrix} I_t \\ I_{a1} \\ I_{a2} \\ I_r \end{bmatrix} \quad (17)$$

where $X_{tr} = j\omega M_{tr}$ and $M_{tr}$ is the mutual inductance between the excitation coil and the receiver pad.

Based on the above new system matrix, the corresponding voltage and the current relationship can be derived:

$$I_t = U_{in} \cdot \frac{-X_{a1}X_{a2}X_r + X_{ar1}^2 X_{a2} + X_{ar2}^2 X_{a1} - X_{a1}X_{a2}R_E}{A + BR_E + D} \quad (18)$$

$$I_r = U_{in} \cdot \frac{-X_{ta1}X_{ar1}X_{a2} - X_{ta2}X_{ar2}X_{a1} + X_{tr}X_{a1}X_{a2}}{A + BR_E + D} \quad (19)$$

where $D = -2X_{tr}(X_{ta1}X_{ar1}X_{a2} + X_{ta2}X_{ar2}X_{a1}) + X_{a1}X_{a2}X_{tr}^2$.

If both (9) and (11) are satisfied, the transconductance gain $G_{cc}(\omega)$ and the total input impedance $Z_{cc}$ when considering the coupling between the excitation coil and the receiver pad can be obtained as follows:

$$G_{cc}(\omega) = \left| \frac{-X_{ta1}X_{ar1}X_{a2} - X_{ta2}X_{ar2}X_{a1} + X_{tr}X_{a1}X_{a2}}{A + D} \right| \quad (20)$$

$$Z_{cc}(\omega) = \frac{A + D}{-X_{a1}X_{a2}R_E}.$$

In (20), it is clear that both the numerator and the denominator remain independent of $R_E$. Therefore, the CC charging mode can still be achieved. In (21), the terms A and D in the numerator are real values while $-X_{a1}X_{a2}R_E$ in the denominator is real valued as well. Therefore, the ZPA condition is achieved despite the mutual inductance between the excitation coil and the receiver pad.

It is worth noticing that D is a negative real value in most cases resulting in the decrease of the total input impedance. In such a way, the total input impedance will drop because of $M_{tr}$, which could increase the current in each resonant tank in the system and decrease the transmission efficiency. Thus, it is better to keep $M_{tr}$ as low as possible if other requirements are met in the design process. Having a non-zero value of transmitter-receiver mutual inductance will cause the input impedance term to become smaller. This means that in order to deliver a desired value of power, one would will need to drive a higher value of current in the system. This will ultimately increase the losses in EQQ transmitter, and thus reduce the system efficiency.

FIG. 7 is a graph 700 showing the transconductance gain 702 and phase angle of the input impedance 704 for different load resistances and operating frequencies for the embodiment of the WPT system in FIG. 4, taking into account the mutual inductance between the receiver pad and the excitation coil. As shown in FIG. 7, the system can still operate at 85 kHz while achieving CC charging mode and ZPA with various loads, even if $X_{tr}$ is taken into account.

In most EV charging cases, the battery is charged up to around 90% state of charge (SOC) in the CC charging mode. Therefore, it is crucial to ensure that the CC charging process has a high efficiency among all misalignments. In terms of the receiver side, once the output power and the battery voltage are fixed, the charging current is constant as well. Thus, current distribution in the excitation coil and two quadrature auxiliary coils can be adjusted properly in order to achieve higher efficiency. For example, when an EV initially "rolls up" to a wireless charging pad, it will usually have a battery which is significantly below 90% SOC. Thus, it must spend significant time while charging at constant current (CC) as the rate of increase of battery's SOC is slow. Thus, it is imperative to ensure that CC charging has high efficiency, since this will reduce the energy lost over a charging cycle.

An embodiment has been tested with up to 200 mm lateral misalignment, and 100 mm misalignment in the direction of driving.

As can be seen in FIG. 1, it is apparent that the size of the excitation coil is much smaller than that of the auxiliary coils, resulting in a lower parasitic resistance for the excitation coil compared to the auxiliary coils.

Having a smaller excitation coil relative to the size of the auxiliary coil is useful in order to avoid/reduce coupling between the excitation coil and receiver, while having a small enough distance to have a practically sized transmitter pad. In a prototype of the example system, the area of the excitation coil is 47% of the area of each auxiliary coil. Other variations are possible.

To increase the efficiency, one can decrease the current in the auxiliary coils. According to (12), there is a 90 degree phase shift between the currents in the excitation coil and the receiver pad.

There are two applicable ways to decrease the current in the auxiliary coils in order to increase the transmission efficiency of the EQQ transmitter system. First, one can increase mutual inductances between the excitation coil and the auxiliary coils. Second, one can increase the desired input current, $I_t^{desired}$.

Take the first auxiliary coil, for example. Based on (13), there are three variables that can influence its current magnitude, namely $X_{ta1}$, $X_{ar1}$ and $X_{a1}$. However, $X_{ar1}$ is partly determined by the receiver pad and the relative position between the first auxiliary coil and the receiver pad, which is difficult to design beforehand. Therefore, only $X_{ta1}$ and $X_{a1}$ can be adjusted to decrease the current in the first auxiliary coil. Furthermore, $X_{ta1}$ and $X_{a1}$ are not completely independent of each other. In the CC charging mode, if the ZPA condition is achieved and $X_{a1}$ is equal to $X_{a2}$, the desired total input impedance in (10) can be simplified as the following equation:

$$\left| Z_{cc}^{desired} \right| = \frac{P_{in}^{rated}}{\left(I_t^{rated}\right)^2} = \frac{(X_{ar1}X_{ta1} + X_{ar2}X_{ta2})^2}{X_{a1}^2 R_E}. \quad (22)$$

where $P_{in}^{rated}$ is the desired rated input power of the WPT system and $I_t^{rated}$ is the desired input current in the excitation coil. These two parameters should be determined at the initial design stage.

In the well-aligned case, $X_{ar1}$ is close to $X_{ar2}$ and $X_{ta1}$ is close to $X_{ta2}$. Therefore, the above equation can be further simplified as $$|Z_{cc}^{desired}| = \frac{P_{in}^{rated}}{(I_t^{rated})^2} = \frac{4X_{ar1}^2 X_{ta1}^2}{X_{a1}^2 R_E}, \quad (23)$$

and thus $$X_{a1} = \sqrt{\frac{4X_{ar1}^2 (I_t^{rated})^2}{R_E P_{in}^{rated}}} X_{ta1} \quad (24)$$

The amplitude of $i_{a1}$ can be obtained as follows:

$$|i_{a1}| = \frac{1}{\sqrt{\frac{4X_{ar1}^2}{R_E P_{in}^{rated}}}} + \frac{X_{ar1}}{\sqrt{\frac{4X_{ar1}^2}{R_E P_{in}^{rated}} I_t^{rated} X_{ta1}}} I_r \quad (24.1)$$

At a particular operating point, $P_{in}^{rated}$, $I_r$, $R_E$ and $X_{ar1}$ are fixed above. Thus, the only ways to reduce the amplitude of $i_{a1}$ are to increase $X_{ta1}$ or increase $I_t^{rated}$. Normally, the most effective way to increase $X_{ta1}$ or $X_{ta2}$ is to increase the size of the auxiliary coil or the excitation coil. However, the size of the auxiliary coil determines the overall size of the pad in the ground facility, which is restricted by the requirement from the cost and leakage magnetic field prospective. If the size of the excitation coil is enlarged, the mutual inductance between the excitation coil and the receiver pad cannot be neglected. The other ways to increase $X_{ta1}$ or $X_{ta2}$ are making the excitation coil closer to the auxiliary coil or designing the unique ferrite placement in the transmitter pad.

From the above, increasing $I_t^{rated}$ leads to the decline of the amplitude of $I_{a1}$, (since the rated input power is a fixed specification). By this way, the current is "shifted" from the auxiliary coil to the excitation coil. Since the excitation coil has a smaller physical size and the lower intrinsic resistance, this "shifting" method can not only reduce the leakage flux density in the surrounding area but also increase the transmission efficiency. However, shifting current to the excitation coil will increase power electronics losses in the inverter which drives it. Therefore, there is a trade-off between the current flowing in the excitation coil and the auxiliary coils.

Lateral misalignment between the transmitter pad and the receiver pad is inevitable if a car is parked manually. The following section is directed to a Misalignment tolerance analysis of the proposed EQQ transmitter WPT system.

As shown in (9), the impedance in the excitation resonant tank, $X_t$, is not dependent on $X_{ar1}$ or $X_{ar2}$, which suggests that the CC charging mode can be achieved regardless of lateral misalignment. This is useful in use cases such as an electrical vehicle charging system in which lateral misalignment may be inevitable. On the other hand, according to (11), the impedance in the receiver resonant tank, $X_r$, is related to the lateral misalignment between the transmitter pad and the receiver pad. This can cause loss of ZPA on the transmitter side. In some embodiments, this problem may be solved by using a switched capacitor in the receiver side in order to maintain the ZPA condition under different misalignment cases along with an on-line mutual inductance detection unit in order to obtain the mutual inductances in different misalignment cases and derive a capacitor value needed in the receiver resonant tank. The controller of such a switched capacitor increases the circuit complexity and the cost in the receiver side.

In some embodiments, it is acceptable from the VA rating and the transmission efficiency points of view to compromise the power factor to a certain level in order to keep the receiver side compact and robust. For example, a lower bound on power factor of the system of 0.9 within the required lateral misalignment range may be selected.

If there is a lateral misalignment between the transmitter pad and the receiver pad, the total input impedance from the transmitter side, $Z'_{cc}$, can be written as (assuming $X_{a1}=X_{a2}$):

$$Z'_{cc}(\omega) = \frac{(X'^2_{ar1} + X'^2_{ar2} - (X'_{ar1}X_{ta2} - X'_{ar2}X_{ta1})^2}{(X^2_{ar2} - X'^2_{ar2})X_{a1} + (X^2_{ar1} - X'^2_{ar1}) - X^2_{a1}R_E} \quad (25)$$

where $X'_{ar1}$ and $X'_{ar2}$ are the impedances of the mutual inductances between each auxiliary coil and the receiver pad in the misalignment case, while $X_{ar1}$ and $X_{ar2}$ are the impedances of mutual inductances between each auxiliary coil and the receiver pad in the well-aligned case.

If $X_{ta1} \approx X_{ta2}$, then $Z'_{cc}$ can be further simplified as $$Z'_{cc} = \frac{X^2_{ta1}(X'_{ar1} + X'_{ar2})^2}{(X^2_{ar2} + X^2_{ar1} - X'^2_{ar2} - X'^2_{ar1})X_{a1} - X^2_{a1}R_E}. \quad (26)$$

Then the phase angle of $Z'_{cc}$ can be derived:

$$\tan(\theta) = \frac{X^2_{ar2} + X^2_{ar1} - X'_{ar1}}{X_{a1}R_E}. \quad (27)$$

If the objective is to keep the power factor, cosΘ, above a certain threshold, then the maximum value of |tanθ| can be determined. For example, if the objective is have a power factor of at least 0.9, then sin θ≥0.9, |tanθ|≤0.48, and the condition to maintain the power factor higher than 0.9 is.

$$\left| \frac{X^2_{ar2} + X^2_{ar1} - X'^2_{ar2} - X'^2_{ar1}}{X_{a1}R_E} \right| \leq 0.48. \quad (28)$$

According to the above equation, the method to enhance the misalignment tolerance is to increase the impedances of the resonant tanks in two auxiliary coils, namely $X_{a1}$ and $X_{a2}$. Methods of achieving this practically were discussed above.

The process of designing an EQQ system according to one embodiment may be a five-step process, but may in other embodiments include more or less steps, and may be performed in various orders.

The first step in designing the system, according to some embodiments, is to define the specifications of the system. For example, a 3 kW WPT system may be defined to have the following system specifications: nominal input voltage $U_{in}$ (defined in FIG. 3): 160 V(RMS), rated output power $P_o$=3 kW, rated output current $I_o$=10 A (defined in FIG. 2), estimated overall system efficiency η=94%, operating frequency of the WPT system $f_s$=85 kHz, nominal separation between the receiver pad and the second quadrature auxiliary coil $Z_{gap}$=200 mm (defined in FIG. 1), and maximum lateral receiver pad displacement $d_{mis}=\pm 150$ mm (defined in FIG. 1).

The second step in designing the system, according to some embodiments, is to determine the total input impedance of the system. The desired input rated power can be obtained by $P_{in}=P_o/\eta$. Then total input impedance can be calculated given that the ZPA condition is achieved in well-aigned case.

$$|Z_{cc}| = \frac{U_{in}^2}{P_{in}}. \quad (29)$$

The third step in designing the system, according to some embodiments, is to determine the impedances of the transmitter $X_t$ and the resonant tank $X_r$. From the analysis above, $X_t$ and $X_r$ should satisfy the following equations in order to achieve the CC charging and the ZPA.

$$\begin{cases} X_t = \dfrac{X_{ta1}^2 X_{a2} + X_{ta2}^2 X_{a1}}{X_{a1} X_{a2}} & (CC) \\ X_r = \dfrac{X_{ar1}^2 X_{a2} + X_{ar2}^2 X_{a1}}{X_{a1} X_{a2}} & (ZPA) \end{cases} \quad (30)$$

Where, as set out above, $X_{ar1}$ and $X_{ar2}$ in the ZPA equation are the mutual impedances in the well-aligned case.

The fourth step in designing the system, according to some embodiments, is to determine the impendences of the auxiliary coil tank, $X_{a1}$ and $X_{a2}$. According to (1), the equivalent resistance $R_E$ can be calculated first. In order to achieve the symmetry of the EQQ transmitter system, $X_{a1}$ equals to $X_{a2}$. Then by substituting (30) into (10), the total input impedance is a function of $X_{a1}$ as stated in (22). Therefore, by solving the following equation, the required $X_{a1}$ and $X_{a2}$ can be obtained.

$$|Z_{cc}(X_{a1})| = \frac{(X_{ar1} X_{ta1} + X_{ar2} X_{ta2})^2}{X_{a1}^2 R_E} = \frac{U_{in}^2}{P_{in}}. \quad (31)$$

Once the required $X_{a1}$, $XX_{a2}$, $X_t$ and $X_r$ are calculated, the values of the compensation capacitor in each resonant tank can be obtained accordingly. Normally, multiple solutions can be obtained by solving the above equation.

The fifth and final step in designing the system is to determine the misalignment tolerance using (28). If (28) cannot be satisfied, the coil structure should be modified based on the discussion above. The second through fifth steps of the design process would then be repeated, according to some embodiments.

In order to verify the above attributes of the EQQ transmitter WPT system, a 3 kW experiment setup was built in the lab and tested in comparison with a prototype of a three-coil WPT system.

FIG. 8A and FIG. 8B are line drawings 800 of the experimental EQQ transmitter WPT system and the prototype three-coil WPT system. The experimental EQQ transmitter system is shown in FIG. 8A. The prototype three-coil WPT system is shown in FIG. 8B.

In the three-coil system, the copper area of the repeater coil (650 mm×410 mm with 22 turns) is similar to the copper areas of two auxiliary coils, 802 and 804 in the EQQ transmitter WPT system. The excitation coil 806 and receiver pad 808 are identical in the two systems. The vertical distance between the repeater coil 810 and excitation coil 806 in the three-coil system is the same as the vertical distance between the auxiliary coil 2 804 and the excitation coil 806 in the EQQ WPT system. The design parameters of the EQQ transmitter WPT system are shown in Table 1 and the inductance matrix of the system in the well-aligned case is illustrated in Table 2. The experimental setup is built based on the circuit shown in FIG. 2. In the experiment, a variable resistive load is used so that the load condition can be adjusted to verify the CC charging mode.

TABLE 1

Design Parameters of the EQQ Transmitter WPT System

| Parameter | Quantity |
|---|---|
| Dimension of the excitation coil ($d_{lt} \times d_{wt}$) | 185 mm × 410 mm (8 turns) |
| Dimension of the receiver coil ($d_{lr} \times d_{wr}$) | 325 mm × 325 mm (18 turns) |
| Dimension of the auxiliary coil ($d_{la} \times d_{wa}$) | 390 mm × 410 mm (22 turns) |
| Overlap length of two auxiliary coils (D) | 130 mm |
| Diameter of the litz wire in the excitation coil and the receiver coil | 6.53 mm |
| Diameter of the litz wire in the auxiliary coils | 3.75 mm |
| Dimension of the ferrite in the EQQ transmitter pad | 670 mm × 550 mm × 5 mm |
| Dimension of the ferrite layer in the receiver pad | 350 mm × 350 mm × 5 mm |
| Dimension of the aluminum sheet in the EQQ transmitter pad | 920 mm × 615 mm × 2 mm |
| Dimension of the aluminum sheet in the receiver pad | 370 mm × 370 mm × 2 mm |
| Excitation coil to Auxiliary coil 1 ($h_{ta}$) | 11 mm |
| Auxiliary coil 1 to Auxiliary coil ($h_{aa}$) | 7 mm |

TABLE 2

Inductance Matrix of the EQQ Transmitter WPT System

| System Parameter | Quantity |
|---|---|
| Self-inductance of the transmitter coil | 33.1 µH |
| Self-inductance of the auxiliary coil 1 | 271.69 µH |
| Self-inductance of the auxiliary coil 2 | 258.21 µH |
| Self-inductance of the receiver pad | 92.77 µH |
| Mutual inductance between the transmitter coil and the auxiliary coil 1 | 22.5 µH |
| Mutual inductance between the transmitter coil and the auxiliary coil 2 | 21.95 µH |
| Mutual inductance between the auxiliary coil 1 and the receiver pad | 12.01 µH |
| Mutual inductance between the auxiliary coil 2 and the receiver pad | 12.11 µH |
| Mutual inductance between the transmitter coil and the receiver pad | 3.13 µH |

FIG. 9A and FIG. 9B is a pair of graphs 900A and 900B showing the waveforms of the input voltage and excitation and auxiliary coil currents in the experimental EQQ transmitter WPT system. FIG. 9A shows these waveforms in the case of a well-aligned receiver pad. FIG. 9B shows these waveforms in the case of a 150 mm lateral misalignment.

At the top of FIGS. 9A and FIG. 9B are the waveforms for the voltage supplied by the inverter $V_{in}$, and the current in the excitation coil $I_r$. In the middle of the graphs in FIGS. 9A and FIG. 9B is the current in the first auxiliary coil $I_{a1}$. At the bottom of the graphs in FIGS. 9A and 9B is the current in the second auxiliary coil $I_{a2}$.

As shown in FIG. 9A, when the receiver pad is in the well-aligned position, the output voltage from the inverter is well in phase with the current in the excitation coil. When the receiver pad has a 150 mm lateral misalignment, the output voltage from the inverter is still nearly in phase with the current in the excitation coil (power factor: 0.96), which is shown in FIG. 9B. Therefore, it is verified that the resonant compensation method described above allows the system to achieve the ZPA condition within a 150 mm lateral misalignment range.

In terms of CC mode verification, the resistive load is varied from 20 Ω to 30Ω in the experiment to effectively represent the voltage of the battery changing from 200 V to 300 V if the DC output current is set as 10 A.

FIG. 10 is a graph 1000 showing the experimental results of the effect of changing the resistive load of the experimental EQQ transmitter WPT system on the DC output current in both the well-aligned and 150 mm lateral misalignment cases.

According to the experimental results, shown in FIG. 10, the DC output current variation is less than 4% even in the 150 mm misalignment case as the load resistance increase from 20Ω to 30Ω which is acceptable for the electric vehicle charging application.

FIG. 11 is a graph 1100 showing experimental results for system efficiencies of the EQQ transmitter WPT system and the three-coil system. Both the coil-to-coil and DC-DC efficiencies of the three-coil system are displayed. The theoretical simulated coil-to-coil efficiency of the EQQ transmitter WPT system is also displayed for comparison.

The coil-to-coil efficiency of the EQQ transmitter WPT system drops from 94.5% to 91% when the receiver pad has a 150 mm misalignment. In terms of DC-DC transmission efficiency, the proposed EQQ transmitter WPT system is up to 92.3% in well-aligned case and reaches 88.5% in the worst misalignment case.

When it comes to the three-coil system, it has a close coil-to-coil transmission efficiency compared to the EQQ transmitter WPT system. However, it has lower DC-DC transmission efficiency in different misalignment cases. At the −150 mm misalignment case, the DC-DC transmission efficiency in the three-coil system is 87.2%. The reason for this is that the current in the transmitter coil is higher (38.3 A in the three-coil system; 30.69 A in the EQQ WPT system) in the misalignment case due to a reduced power factor, which results in higher loss in the half-bridge inverter. The conventional three-coil WPT system, shown in FIG. 8B, has been proven to improve the transmission efficiency compared with the conventional two-coil system. The proposed EQQ transmitter WPT system shows further improvement in terms of transmission efficiency. Furthermore, the EQQ transmitter WPT system can reduce the leakage flux density under different misalignment cases since the current distribution in two quadrature auxiliary coils is naturally biased towards the auxiliary coil which is near the receiver. The experimental results for leakage flux density are discussed in the following sub-section.

FIG. 12 is a schematic 1200 of a measurement performed to determine the leakage flux density of the experimental EQQ transmission WPT system and the three-coil WPT system.

Three 800 mm×600 mm measurement planes were set 800 mm away from the center of the receiver pad. The maximum leakage flux density among these three planes were simulated and measured in the experiment in the worst lateral misalignment case.

This is representative of where a human could stand. The leakage flux density across the entirety of each plane is simulated for the worst-case lateral misalignment values of +/−150 mm. The point corresponding to the largest flux density in all of the planes is defined as the worst case of the leakage flux density. For example, when the receiver pad has a 150 mm lateral misalignment, the worst case of the leakage flux density is simulated in measurement plane 2 in both the EQQ transmitter WPT system and the three-coil WPT system.

When the receiver pad has 150 mm lateral misalignment as shown in FIG. 12, the maximum leakage flux density, both in the EQQ WPT system and the three-coil WPT system, were measured in the measurement plane 2, which matched the simulation results.

As shown in FIG. 13A and FIG. 13B, the leakage flux distribution 1300A and 1300B of two WPT systems in measurement plane 2 are displayed. The proposed EQQ transmitter WPT system is seen to yield significant lower leakage flux compared to the three-coil system. Experimental results are then obtained where a Hioki™ FT3470-50 MAGNETIC FIELD HiTESTER is used to measure the leakage flux density at the worst-case locations which were identified by the simulation (see location marked by 'X' in FIG. 13A and FIG. 13B)

As shown in Table 3, the maximum leakage flux density among the three measurement planes can be reduced 40% (from 21.5 μT to 12.96 ptT) in a 3 kW EQQ transmitter WPT system compared to a 3 kW three-coil system. Thus, it can be concluded that currents distribution in two auxiliary coils in the EQQ transmitter WPT system can help reduce the leakage flux density when the receiver pad has a lateral misalignment.

TABLE 3

| Leakage flux density measurement results | | |
|---|---|---|
| Lateral Misalignment | EQQ Transmitter WPT System | Three-coil System |
| 150 mm | 11.86 μT (experimental) 11.63 μT (simulated) | 21.5 μT (experimental) 20.05 μT (simulated) |
| −150 mm | 12.96 μT (experimental)/ 13.09 μT (simulated) | 21.5 μT (experimental) 20.05 μT (simulated) |

As described in various embodiments, a new excitation-quadrature-quadrature (EQQ) transmitter pad is proposed, which includes one excitation coil powered by an inverter unit and two decoupled quadrature auxiliary coils. By using the presented resonant tank design method, the proposed WPT system can achieve constant current (CC) charging and zero phase angle (ZPA) conditions. When there is a lateral misalignment in the receiver pad, the auxiliary coil that is better coupled with the receiver pad conducts more current than the more distant auxiliary coil does. This current distribution attribute of the system can reduce the leakage magnetic field in the surrounding area.

In order to verify the benefits of the proposed system, both the EQQ transmitter WPT system and the three-coil system were built and tested in the lab with 200 mm vertical transmitter-to-receiver distance.

Based on the experiment results, the EQQ transmitter WPT system can achieve CC and ZPA conditions within +/−150 mm lateral misalignment range. Compared to the three-coil system, the EQQ transmitter WPT system has a higher dc-dc efficiency and 40% lower leakage flux density in 150 mm lateral misalignment case, which suggests that the proposed WPT system of some embodiments can reduce the leakage magnetic field effectively when transferring kW level power.

As shown in FIG. 14 and FIG. 15A and FIG. 15B in drawings 1400, 1500A and 1500B, the proposed WPT system can be utilized, for example, by establishing an improved charging station that can be incorporated into parking spots at a parking lot where a vehicle, while parked or stopped, can be automatically charged. An advantage of the proposed WPT system is that there is improved tolerance for misalignments in parking (i.e., between the transmitter pad and the receiver pad) through the specific design and selection of characteristics of the compensation capacitors of the resonant tanks.

As described in further detail herein, as shown in FIG. 15B, the proposed WPT system is able to automatically and autonomously adjust to steer a magnetic field towards a receiver, which could be particularly important in preventing safety issues by reducing a leakage magnetic flux. In this example in FIG. 15B, the person may be standing directly over one or both of the auxiliary coils.

Other variations are possible. For example, a WPT system can be utilized to establish charging infrastructure for mass transit (e.g., a subway, a streetcar, a bus), and can be integrated directly into portions of track or expected stopping locations, for example, at stations, bus stops, depots, etc. The WPT system need not be stationary—in some embodiments, the WPT system is mounted on a conveyance mechanism, such as an arm, and can be moved to interface with a receiver pad. This can be used, for example, where the receiver pad location is known. In another embodiment, the receiver pad location can be static with respect to a vehicle, and the transmitter pad may be moved to interface with the receiver pad (e.g., consider an aerial re-fueling example, where an arm is extended from a charger aircraft to a port of a target aircraft and maintained in position for a period of time to charge).

Vehicles are not limited to cars, and can include, for example, ferries, industrial robots, etc. Ferries and industrial robots may have designated locations having corresponding WPT systems (e.g. ferry dock).

In another embodiment, the WPT system is utilized to charge any device having an energy source, such as cellphones, lawnmowers, generators, etc.

Applicant notes that the described embodiments and examples are illustrative and non-limiting. Practical implementation of the features may incorporate a combination of some or all of the aspects, and features described herein should not be taken as indications of future or existing product plans.

The term "connected" or "coupled to" may include both direct coupling (in which two elements that are coupled to each other contact each other) and indirect coupling (in which at least one additional element is located between the two elements).

Although the embodiments have been described in detail, it should be understood that various changes, substitutions and alterations can be made herein without departing from the scope. Moreover, the scope of the present application is not intended to be limited to the particular embodiments of the process, machine, manufacture, composition of matter, means, methods and steps described in the specification.

As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

As can be understood, the examples described above and illustrated are intended to be exemplary only.

What is claimed is:

1. A wireless charging system adapted for lateral misalignment tolerance, the wireless charging system comprising:
 a transmitter pad, the transmitter pad including:
  an excitation coil coupled to a power source;
  a first auxiliary charging coil inductively coupled to the excitation coil and not physically coupled to the power source, the first auxiliary charging coil has a larger surface area than the excitation coil and is positioned at a first height relative to the excitation coil having a corresponding midpoint offset relative to a midpoint of the excitation coil; and
  a second auxiliary charging coil inductively coupled to the excitation coil and not physically coupled to the power source, the second auxiliary charging coil has a larger surface area than the excitation coil and is positioned at a second height relative to the excitation coil having a corresponding midpoint offset relative to the midpoint of the excitation coil, the second auxiliary charging coil overlaps with the first auxiliary charging coil relative to a plane of the excitation coil, the overlap relative to the plane of the excitation coil inductively decouples the first and second auxiliary charring coils;
  a first auxiliary tank, comprising the first auxiliary charging coil and at least one or more first auxiliary charging coil compensation capacitors;
  a second auxiliary tank, comprising the second auxiliary charging coil and at least one or more second auxiliary charging coil compensation capacitors, the second auxiliary tank has a matching impedance with the first auxiliary tank, due to the compensation of the first and second auxiliary compensation capacitors, so that the first and second auxiliary tanks are electrically symmetrical along a horizontal plane with respect to the midpoint of the excitation coil;
 a receiver pad magnetically coupled to the first auxiliary charging coil and the second auxiliary charming coil, and laterally misaligned with the midpoint of the excitation coil the first auxiliary charging coil and the second auxiliary charging coil together project a magnetic flux to interface with the receiver pad;
 wherein the at least one or more first auxiliary charging coil compensation capacitors and the at least one or more second auxiliary charging coil compensation capacitors have corresponding variable and selectable capacitances that are selected to, free of active control of the capacitors, maintain a substantially zero phase angle (ZPA) condition between an excitation voltage and an excitation current during interfacing with the receiver pad such that the projected magnetic flux is effectively steered in a direction of the receiver pad through an automatic biasing of current distribution in the first auxiliary charging coil and the second auxiliary charging coil towards the auxiliary charging coil which is nearest to the receiver pad to reduce leakage magnetic flux from the auxiliary charging coil which is farthest from the receiver pad.

2. The wireless charging system of claim 1, wherein the first auxiliary charging coil and the second auxiliary charging coil are substantially symmetrical in displacement with respect to a centroid of the excitation coil.

3. The wireless charging system of claim 1, wherein the first auxiliary charging coil and the second auxiliary charging coil are substantially symmetrical in displacement displaced along a horizontal plane with respect to the midpoint of the excitation coil.

4. The wireless charging system of claim 1, wherein the impedance of the first auxiliary coil tank and the impedance of the second auxiliary coil tank are obtained by the equation:

$$|Z_{cc}(X_{a1})| = \frac{(X_{ar1}X_{ta1} + X_{ar2}X_{ta2})^2}{X_{a1}^2 R_E} = \frac{U_{in}^2}{P_{in}}.$$

where $X_{ar1}$ and $X_{ar2}$ are impedances of the mutual inductances between the first and second auxiliary charging coils and the receiver pad; $X_{ar1}$ is the equivalent impedance of the first auxiliary charging coil; $Z'_{cc}$ is a total input impedance from the transmitter pad; $R_E$ is the equivalent resistance; $X_{ta1}$ and $X_{ta2}$ are impedances of the mutual inductances between the first and second auxiliary charging coils and the excitation coil; $P_{in}$ is a desired rated input power of the system ad $U_{in}$ is an input voltage to the system.

5. The wireless charging system of claim 1, wherein the first auxiliary charging coil and the second auxiliary charging coil are adapted for maintaining constant charging conditions simultaneously with maintaining the ZPA condition.

6. The wireless charging system of claim 1, further including magnetic shielding layers, wherein the corresponding capacitances are selected after accounting for the impact on a mutual coupling of the magnetic shielding layers.

7. The wireless charging system of claim 1, wherein establishing the ZPA condition causes corresponding current distributions in the first auxiliary charging coil and the second auxiliary charging coil to adjust autonomously according to the lateral misalignment.

8. The wireless charging system of claim 1, the magnetic flux projected to the receiver pad by the first auxiliary charging coil and the second auxiliary charging coil is at least 90% higher, due to the larger surface area of the first and second auxiliary charging coils, than a magnetic flux projected by the excitation coil to the receiver pad.

9. The wireless charging system of claim 1, wherein the transmitter pad is coupled to a vehicle parking spot or the transmitter pad is coupled to an arm mechanism.

10. The wireless charging system of claim 1, further including a wireless communications circuit configured to receive one or more data sets representative of a state of charge of an energy source coupled to the receiver pad, and the one or more data sets are utilized to control one or more characteristics of energy provided by the transmitter pad.

11. A method adapted for a transmitter pad providing wireless charging despite lateral misalignment tolerance, the method comprising:

coupling an excitation coil to a power source;
inductively coupling a first auxiliary charging coil to the excitation coil, the first auxiliary charging, coil is not physically coupled to the power source and has a larger surface area than the excitation coil, and is positioned at a first height relative to the excitation coil having a corresponding midpoint offset relative to a midpoint of the excitation coil; and
inductively coupling a second auxiliary charging coil to the excitation coil, the second auxiliary charging coil is not physically coupled to the power source and has a larger surface area than the excitation coil, and is positioned at a second height relative to the excitation coil having a corresponding midpoint offset relative to the midpoint of the excitation coil;
overlapping the second auxiliary charging coil with the first auxiliary charging coil relative to a plane of the excitation coil, the overlap relative to the plane of the excitation coil inductively decoupling the first and second auxiliary charging coils;
matching an impedance of a first auxiliary tank with a second auxiliary tank through selection of compensation capacitors, so that the first and second auxiliary tanks are electrically symmetrical along a horizontal plane with respect to the midpoint of the excitation coil the first auxiliary tank comprising the first auxiliary charging coil and at least one or more first auxiliary charging coil compensation capacitors and the second auxiliary tank comprising the second auxiliary charging coil and at least one or more second auxiliary charging coil compensation capacitors;
magnetically coupling a receiver pad to the first auxiliary chaining coil and the second auxiliary charging coil, the receiver pad being laterally misaligned with the midpoint of the excitation coil; and projecting a magnetic flux from the first auxiliary charging coil and the second auxiliary charging coil to interface with the receiver pad;
wherein the at least one or more first auxiliary charging coil compensation capacitors and the at least one or more second auxiliary charging coil compensation capacitors have corresponding variable and selectable capacitances that are selected to, free of active control of the capacitors, maintain a substantially zero phase angle (ZPA) condition between an excitation voltage and an excitation current during interfacing with the receiver pad such that the projected magnetic flux is effectively steered in a direction of the receiver pad through an automatic biasing of current distribution in the first auxiliary charging coil and the second auxiliary charging coil towards the auxiliary charging coil which is nearest to the receiver pad to reduce leakage magnetic flux from the auxiliary charging coil which is farthest from the receiver pad.

12. The method of claim 11, wherein the first auxiliary charging coil and the second auxiliary charging coil are substantially symmetrical in displacement with respect to a centroid of the excitation coil.

13. The method of claim 11, wherein the first auxiliary charging coil and the second auxiliary charging coil are substantially symmetrical in displacement displaced along a horizontal plane with respect to the midpoint of the excitation coil.

14. The method of claim 11, wherein the impedance of the first auxiliary coil tank and the impedance of the second auxiliary coil tank are obtained by the equation:

$$|Z_{cc}(X_{a1})| = \frac{(X_{ar1}X_{ta1} + X_{ar2}X_{ta2})^2}{X_{a1}^2 R_E} = \frac{U_{in}^2}{P_{in}}.$$

where $X_{ar1}$ and $X_{ar2}$ are impedances of the mutual inductances between the first and second auxiliary charging coils and the receiver pad; $X_{a1}$ is the equivalent impedance of the first auxiliary charging coil; $Z'_{cc}$ is a total input impedance from the transmitter pad; $R_E$ is the equivalent resistance;

$X_{ta1}$ and $X_{ta2}$ are impedances of the mutual inductances between the first and second auxiliary charging coils and the excitation coil; $P_{in}$ is a desired rated input power of the system; and $U_{in}$ is an input voltage to the system.

15. The method of claim 11, wherein the first auxiliary charging coil and the second auxiliary charging coil are adapted for maintaining constant charging conditions simultaneously with maintaining the ZPA condition.

16. The method of claim 11, further including magnetic shielding layers, wherein the corresponding capacitances are selected after accounting for the impact on a mutual coupling of the magnetic shielding layers.

17. The method of claim 11, wherein establishing the ZPA condition causes corresponding current distributions in the first auxiliary charging coil and the second auxiliary charging coil to adjust autonomously according to the lateral misalignment.

18. The method of claim 11, wherein the magnetic flux projected to the receiver pad by the first auxiliary charging coil and the second auxiliary charging coil is at least 90% higher, due to the larger surface area of the first and second auxiliary charging coils, than a magnetic flux projected by the excitation coil to the receiver pad.

19. The method of claim 11, wherein the transmitter pad is coupled to a vehicle parking spot or the transmitter pad is coupled to an arm mechanism.

20. The method of claim 11, further including a wireless communications circuit configured to receive one or more data sets representative of a state of charge of an energy source coupled to the receiver pad, and the one or more data sets are utilized to control one or more characteristics of energy provided by the transmitter pad.

\* \* \* \* \*